United States Patent
Ophir et al.

(10) Patent No.: US 9,892,020 B1
(45) Date of Patent: Feb. 13, 2018

(54) USER INTERFACE FOR SPECIFYING DATA STREAM PROCESSING LANGUAGE PROGRAMS FOR ANALYZING INSTRUMENTED SOFTWARE

(71) Applicant: SignalFx, Inc., San Mateo, CA (US)

(72) Inventors: Eyal Ophir, Mountain View, CA (US); Kevin Cheng, Sunnyvale, CA (US)

(73) Assignee: SignalFx, Inc., San Mateo, CA (US)

( * ) Notice: Subject to any disclaimer, the term of this patent is extended or adjusted under 35 U.S.C. 154(b) by 0 days.

(21) Appl. No.: 15/277,787

(22) Filed: Sep. 27, 2016

Related U.S. Application Data

(60) Provisional application No. 62/307,188, filed on Mar. 11, 2016.

(51) Int. Cl.
    *G06F 9/44* (2006.01)
    *G06F 11/36* (2006.01)
    *G06F 17/30* (2006.01)

(52) U.S. Cl.
    CPC ...... *G06F 11/3644* (2013.01); *G06F 11/3692* (2013.01); *G06F 17/3053* (2013.01); *G06F 17/30516* (2013.01)

(58) Field of Classification Search
None
See application file for complete search history.

(56) References Cited

U.S. PATENT DOCUMENTS 8,230,386 B2 * 7/2012 Sedukhin ............ G06F 11/3612
                                                  717/114

* cited by examiner

*Primary Examiner* — Qamrun Nahar
(74) *Attorney, Agent, or Firm* — Fenwick & West LLP

(57) ABSTRACT

An instrumentation analysis system processes data streams by executing instructions specified using a data stream language program. A user interface allows users to specify data stream language programs. The user interface presents widgets to the user to specify various components of a data stream language program including a filter expression, an analytical function representing an aggregation or transformation, and so on. The user interface allows users to specify an expression based on results of previously specified data stream language programs. The instrumentation analysis system processes the data stream language programs specified by the user to generate a set of result data streams and plots the result data streams, for example, on a screen of a client device.

20 Claims, 17 Drawing Sheets

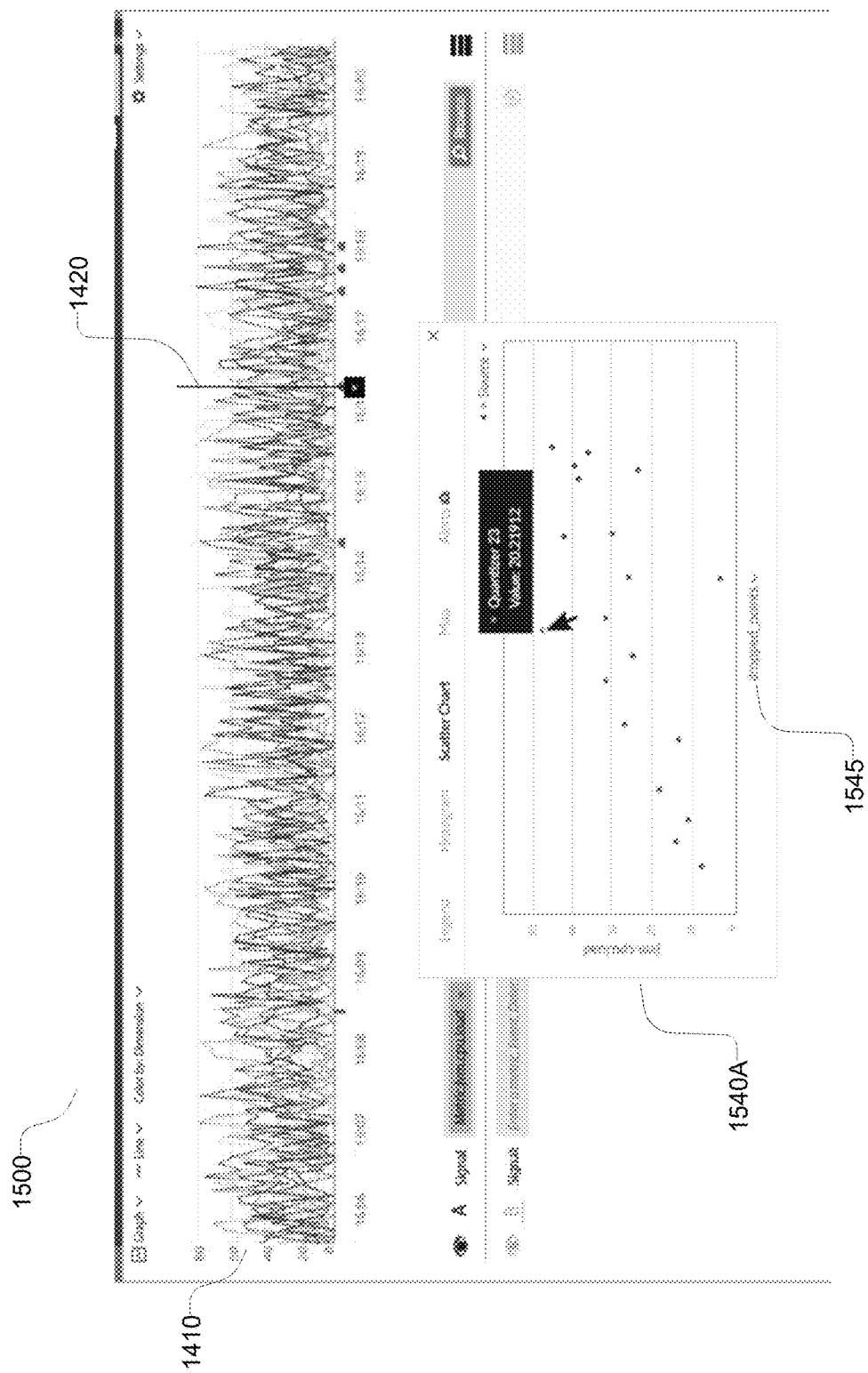

USER INTERFACE FOR SPECIFYING DATA STREAM PROCESSING LANGUAGE PROGRAMS FOR ANALYZING INSTRUMENTED SOFTWARE

CROSS REFERENCES TO RELATED APPLICATIONS

This application claims the benefit of U.S. Provisional Patent Application No. 62/307,188 filed Mar. 11, 2016, which is incorporated by reference in its entirety.

BACKGROUND

This disclosure relates to interfaces for processing data streams in general and more specifically to a visual interface for processing data streams generated by instrumented software executing on external systems.

Software developers monitor different aspects of software they develop by instrumenting the code. These include performance of the software, errors encountered during execution of the software, significant events encountered during execution of the software, information describing which parts of code are being executed and which parts are not being executed, and so on. Conventional techniques for instrumenting code include statements in the code that log different types of information to log files or print information on screens. This type of instrumentation is suitable for simple applications, for example, applications having a simple flow of execution that execute on a single processor. However, these techniques for instrumenting software are inadequate for complex applications that may be distributed across multiple systems, each system executing multiple processes or threads of execution.

One technique conventionally used for instrumenting such complex systems is to use help of experts in instrumenting code. Certain vendors provide expert services that help with instrumentation of code. However, these vendors typically provide standard services that are often not very flexible. Furthermore, these vendor based solutions have significant overhead in terms of time needed by the vendor to instrument code. Accordingly, these solutions are suited towards a slow development cycle, for example, a year-long development cycle. However, software development and release cycles for software products have become short. For example, there are several online systems in which software developers make changes on a monthly, weekly, or even daily basis and deploy them. Due to the significant overhead of vendor based instrumentation solutions, developers find it difficult to use these services in a fast paced development environment.

Furthermore, conventional techniques for instrumenting code cause significant delays in assimilating the information, storing the information, and analyzing the information to generate reports. As a result, there can be significant delay between the time that a problem occurs in the software and the time that the problem is detected via instrumentation of the code. Accordingly, conventional systems for generating reports based on instrumentation of software are often inadequate in fast paced development cycles of complex applications. Furthermore, the amount of data that may be reported as data streams and the complexity of data make visualization of the data difficult. As a result conventional techniques for visualizing data streams and visually interacting with the data reported as data streams to inspect the data or to generate reports based on the data are often inadequate.

SUMMARY

Embodiments describe an instrumentation analysis system that processes data streams received from external systems. The instrumentation analysis system associates data streams with metadata. In an embodiment, the metadata comprises properties of the data streams specified as name-value pairs. A property may associate a data stream with data that may not be received as part of the data stream. For example, a data stream may report cache hits of a program executing on an external system and a property specifying a data center of the external system providing the data stream may be specified as a name-value pair ("data_center", "dc1") and stored by the instrumentation analysis system. The instrumentation analysis system configures a user interface for specifying data stream language programs and presents the user interface via a client device. The user interface comprises widgets for receiving expressions specified using the data stream language.

The instrumentation analysis system receives a plurality of data stream language programs via the user interface. Each data stream language program specified is configured to generate a set of intermediate result data streams. The instrumentation analysis system receives components of each data stream language program, for example, a filter expression for determining a subset of the input data streams and an analytic function for computing an aggregate value based on data values of an input data stream.

The instrumentation analysis system receives via the user interface, an association of each data stream language program with a label. For example, a first data stream language program may be associated with label "A" and a second data stream language program may be associated with label "B". The instrumentation analysis system receives a specification of a combined data stream language program as an expression based on the labels. The instrumentation analysis system configures for presentation, a visual representation of a set of final result data streams generated from the combined data stream language program, each final result data stream comprising result data values. Each result data value is obtained by evaluating the expression by replacing each label by a data value from an intermediate result data stream of the data stream language program corresponding to the label.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIGS. 15A, 15B, and 15C show screenshots of a user interface for analyzing data associated with a point in time, according to an embodiment.

Figure 1:
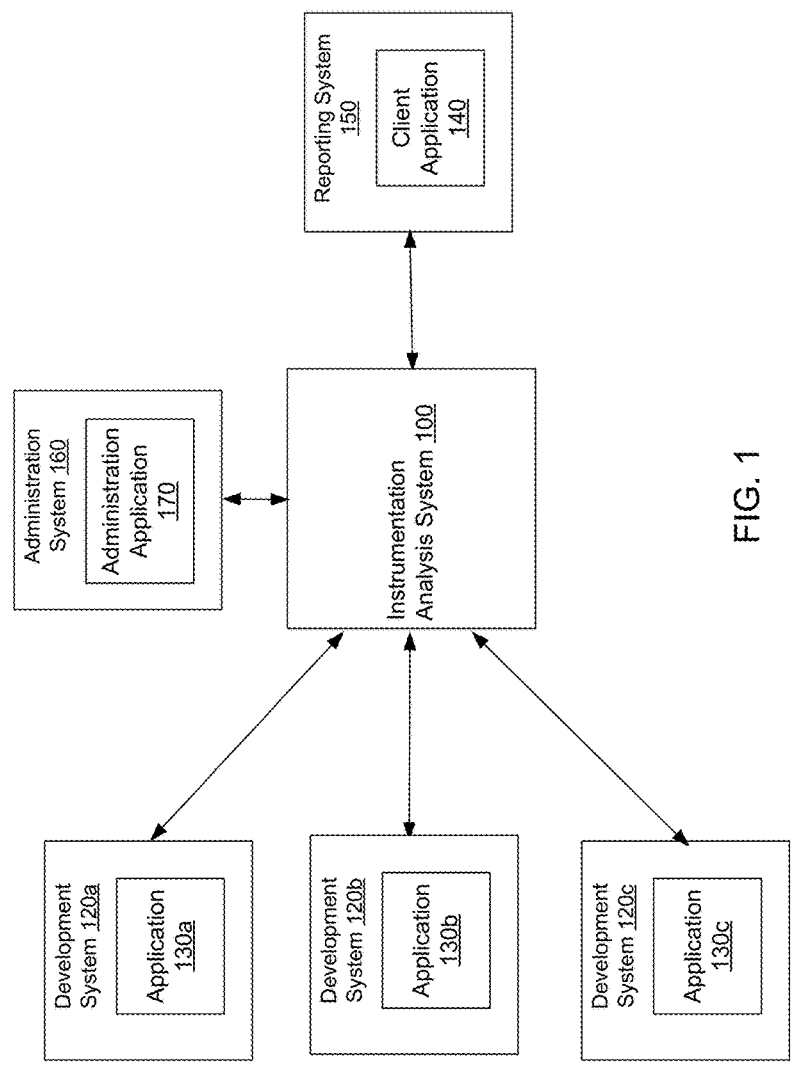
FIG. 1 shows the overall system environment for reporting based on instrumented software, according to an embodiment.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

Embodiments describe an instrumentation analysis system that processes data streams based on instructions specified in a data stream language. A data stream is also referred to herein as a time series or a signal. The data streams are received from instrumented code executing on external systems. The commands of the data stream language are specified as blocks. A block performs certain type of operation (or computation, for example, retrieving data, processing data, and so on.) A block optionally comprises input ports, output ports, and parameters. An input port receives data of data streams that may be received from external systems or generated by other blocks. The result of computation of the block is provided as output to an output port of the block. The parameters associated with the block are used in the specification of the computation of the block. For example, a parameter specifies a search string for a block that finds data streams. A data stream language program comprises a network of blocks, wherein output of a block may be provided as input to other blocks and so on. The instrumentation analysis system presents a user interface that allows the user to specify data stream language programs.

A job represents an execution a data stream language program. Multiple jobs may be executed for the same data stream language program. A job is associated with a start time, stop time, and a periodicity. The job is started at the start time and executed until the stop time. The job comprises instructions executed periodically at time intervals based on the specified periodicity. For each time interval, the job receives data values from a set of data streams and executes the blocks of the data stream language to generate output data values. Other embodiments implement the functionality indicated herein with different syntax and different programming paradigms.

Embodiments of data stream language support a find block that takes an expression as input and identifies data streams based on the search string. The data streams identified are provided as input to the rest of the data stream language program that follows the find block. The find block is typically the first block of a data stream language program. The find block is evaluated periodically. The set of data streams processed by the data stream language program can change from one evaluation of the find block to another. The find block may be evaluated at a periodicity different from the periodicity of execution of the rest of the data stream language program. The search expression is based on metadata attributes describing data streams. The metadata attributes describing a data streams may be received from the source of the data stream (for example, as part of the data provided by the data stream) or may be specified independent of the data of the data stream in a metadata store. The search string of the find block may be changed to change the set of data streams processed by a data stream language program.

Embodiments of the data stream language support grouping of data streams based on metadata attributes describing the data streams. The instructions to group data streams may be specified as a groupby block that specifies one or more metadata attributes for grouping the data streams. The instructions to group data streams are associated with an aggregation function to be evaluated for each group of data streams. The instrumentation analysis system identifies a group of data streams for each distinct value of the metadata attribute for which there are input data streams having that value. For example, if the data stream language program includes instructions to group data streams by datacenters, the instrumentation analysis system identifies as many groups as datacenter values associated with the data streams received. The instrumentation analysis system performs the aggregate function on data streams of each group. For example, a data stream language program may determine a sum of a metric for each group. The instrumentation analysis system repeats the processing of the groupby block for each time interval, thereby generating a set of result data streams. The set of result data streams may dynamically change over time, for example, as a result of changes in the input set of data streams or as a result of modifications to metadata attribute values. The grouping may be performed based on a plurality of metadata attributes. In this situation, a group may be generated for each distinct combination of attribute values associated with the input data streams.

In an embodiment, the data stream language supports a publish block for publishing data streams generated as a result of executing a data stream language program. The publish block may publish the result on a user interface for presentation to the users, store the data of the data streams in a database, and/or provide the data of the data streams to other jobs executing in the instrumentation analysis system via a software bus. The instrumentation analysis system identifies metadata attribute values for result data streams. These metadata attributes describe the data streams and act as coordinates along various dimensions of data streams. Examples of dimensions include metric name, service name, datacenter name, and so on. In an embodiment, the instrumentation analysis system associates with each result data stream generated by a data stream language program (or a portion of the data stream language program) the value(s) of metadata attribute(s) specified with the last groupby block of the data stream language program. Metadata describing the data streams is stored in a metadata store. A data stream identifier is generated for the data stream. The data of the data stream is stored in conjunction with the data stream identifier in a time series data store.

Embodiments of the data stream language program allow comparison of data streams with threshold values. For example, data of data streams may be compared against a low threshold and/or a high threshold value. The low/high threshold values may be constant values or dynamically changing values. The low/high threshold values may be specified by a data stream language program that generates data streams. The threshold block includes an input port and optional low/high threshold ports. The inputs received at each port can be sets of data streams. For example, a data stream language program (or a portion of a data stream language program) may provide input for the input/threshold ports of the threshold block. The data stream language program may include a groupby block that generates a set of data streams that may change dynamically. The instrumentation analysis system matches data streams received at the input port with data streams received at the low/high threshold ports. The instrumentation analysis system compares each data value received at the input port with the corresponding values received at the low/high threshold ports. The instrumentation analysis system may generate an event if the data values received at the input port lie outside the boundaries specified by the low/high thresholds. Accordingly, the low/high threshold values can be specified using sets of data streams that change dynamically (by including more, less, or different data streams at different points in time).

Embodiments of instrumentation analysis system support user defined customized blocks. A customized block includes user defined input/output ports and instructions to be executed by the customized block. The customized block is receives inputs provided by other blocks of a data stream language program and may provide outputs to other blocks of the data stream language program. For example, a customized block may be defined to perform a specific computation on data of input data streams. The instrumentation analysis system executes the customized block by receiving data values at each time interval, performing the specified set of instructions and providing result data values to the output ports. This process is repeated for each time interval, thereby generating one or more result data streams as outputs of the customized block. The instructions of the customized block are specified using blocks of the data stream language program that may include other customized blocks.

Embodiments allow execution of a moving window function that aggregates data points encountered during a time window that advances with time. The window function may perform a computation or may simply display data received, for example, in a chart. If the start time of the window at a particular point in time occurs before the current time, the instrumentation analysis system retrieves at least a portion of the data for the window from a data base storing historical data values. The instrumentation analysis system receives the latest data for the moving window in real time from data streams received by the instrumentation analysis system. The portion of the moving window that is processed using stored data from a database is reduced as time proceeds and the portion of data based on the real time data received from data streams is increased. After a time interval (as long as the length of the window), the instrumentation analysis system receives all data for the window from the data streams received in real time.

Overall System Environment

FIG. 1 shows the overall system environment for reporting based on instrumented software, according to an embodiment. The overall system environment includes an instrumentation analysis system 100, one or more development systems 120 (also referred to as a host or a server), an administration system 160, and a reporting system 150. In other embodiments, more or less components than those indicated in FIG. 1 may be used. For example, development system 120, administration system 160, and reporting system 150 may interact with instrumentation analysis system 100 via a network (not shown in FIG. 1). Furthermore, there may be more or less instances of each system shown in FIG. 1, for example, there may be multiple reporting systems 150.

FIG. 1 and the other figures use like reference numerals to identify like elements. A letter after a reference numeral, such as "130a," indicates that the text refers specifically to the element having that particular reference numeral. A reference numeral in the text without a following letter, such as "130," refers to any or all of the elements in the figures bearing that reference numeral (e.g. "130" in the text refers to reference numerals "130a" and/or "130b" in the figures).

The instrumentation analysis system 100 receives data comprising values of metrics sent by different development systems 120 (the instrumentation analysis system 100 may also be referred to herein as an analysis system or a data analysis system). A development system 120 executes instrumented software, for example, application 130 (a development system 120 is also referred to herein as an external system or a source of data streams.) Although, application 130 is shown in FIG. 1 as an example of instrumented software, the techniques disclosed herein are not limited to application software but are applicable to other kinds of software, for example, server software, software executing on client devices, websites, and so on. Furthermore, a development system 120 comprises any computing system that is configured to execute instrumented software, whether or not it is used for development purposes. For example, the development system 120 may be a computing system used for testing purposes, staging purposes, or any production system executing in an enterprise.

The software executing on a development system 120 is configured to send information generated as a result of instrumenting the software to instrumentation analysis system 100. For example, the application 130 may send values corresponding to various metrics periodically to instrumentation analysis system 100. Different applications 130 may send the same metric or different metrics at different rates. The same application may send different metrics at different rates. The application 130 sends data to the instrumentation analysis system 100 by invoking application programming interface (API) supported by the instrumentation analysis system 100.

The application 130 (or any other software) may be instrumented to add counters or gauges to the application. A counter comprises instructions that store a value that is incremented upon occurrence of certain event in the software. The counter may be used to determine the number of times a particular part of the code is executed, for example, a function or a method, a particular branch of a conditional code, an exception, a loop, and so on.

Typically a counter value changes monotonically, for example, a counter value may increase monotonically. Values of a counter may be compared to determine the change in the particular counter value at two different points in time. For example, the number of times a particular event occurs within a time interval between times t1 and t2 may be determined by computing the change in a corresponding counter value from t1 to t2. The APIs of the instrumentation analysis system may be invoked by the application 130 to send the current value of the counter to the instrumentation analysis system 100.

Following is an example of instrumented code of an application 130. The following instruction included in the code being instrumented creates a counter object for tracking count of an action or entities.

counter1=createCounter(source="web1",
metric="metric1");

The above instruction creates a counter object and assigns it to the variable counter1. The counter object is associated with a source "web1" and metric "metric1." In an embodiment, the source and the metric values uniquely identify the data stream associated with the counter (or a gauge). In other embodiments, more or fewer key value pairs may be used to uniquely identify a data stream.

One or more of the values specified during creation of a counter are received when data corresponding to the counter is sent by the instrumented code to the instrumentation analysis system 100. Embodiments allow the application 130 to be instrumented so as to reduce the amount of information sent with each data stream. This reduces the amount of overhead introduced in the application 130 as a result of instrumenting the code.

The instrumented code of application 130 may include instructions to update the counter value at various places in the code. For example, the counter counter1 may be incremented by executing the instruction "counter1.increment( )." The counter may be incremented to track various actions or entities associated with the code. For example, the counter may be incremented whenever a particular function or method is called, the counter may be incremented whenever a particular branch of a conditional expression is executed, the counter may be incremented whenever an object of a particular type is created, for example, in a constructor of an object. The increment instruction of the counter may be called conditionally, for example, if a function is invoked with a particular combination of parameters. The application 130 communicates the counter value to the instrumentation analysis system 100 by invoking an API of the instrumentation analysis system 100.

A gauge comprises instructions to measure certain runtime characteristics of the application 130, for example, heap size, number of cache misses or hits, active memory used, CPU (central processing unit) utilization, total time taken to respond to a request, time taken to connect to a service, and so on. A gauge may also be used to track certain application specific parameters or business related values, for example, number of transactions, number of users, and so on. The gauge may be invoked periodically based on an interval that is configurable. The value of the gauge is sent to instrumentation analysis system 100 periodically.

The administration system 160 allows a privileged user, for example, a system administrator to associate data streams with metadata. The administration system 160 comprises the administration application 170 that provides a user interface for a system administrator to specify the metadata. The metadata comprises properties, for example, name-value pairs. The instrumentation analysis system 100 receives metadata describing data streams and stores the metadata. The ability to specify metadata describing data streams independently from the data received from each data stream provides several benefits in generating reports based on the data stream.

As an example, the instrumentation analysis system 100 can receive modifications to metadata describing each data stream without requiring any modifications to the instrumented software of the application 130. As a result, the instrumentation analysis system 100 receives specifications of new reports and modifications to existing reports and generates results based on the new/modified reports without requiring the developers to modify applications 130.

This provides for a new paradigm for instrumenting software since the developers do not need to consider the types of reports that need to be generated while adding instructions to instrument the software. The developers simply instrument their software to generate raw data that can be combined in various ways in the generated report.

Furthermore, the persons that are experts at generating the instrumented software can be different from the software developers. For example, an expert at data analysis who is not a developer can define the metadata for the data streams and generate reports without being involved in the development process. This is significant because the skills required for analyzing data are typically different from the skills required for developing software.

Furthermore, the instrumentation analysis system 100 can also receive and process reports built on top of existing reports by composing existing reports and adding new analytics functionality. The instrumentation analysis system 100 generates results of the new reports and sends them for presentation in real-time as the instrumentation analysis system 100 receives data streams from instrumented software. The instrumentation analysis system 100 generates these additional reports and modifies existing reports without requiring any modifications to the instrumented code of application 130.

Furthermore, the instrumentation analysis system 100 provides separation of the metadata describing the data streams from the data of the data streams. Accordingly, the amount of data that needs to be transmitted from the development systems 120 to the instrumentation analysis system 100 is reduced. Each application 130 transmits only the data values of the metrics and information identifying the metric. The metadata information is received separately from a source independent of the data source of the data streams. Accordingly, any amount of metadata may be introduced without increasing the amount of data of each data stream.

The reporting system 150 may be a client device. The reporting system 150 includes a client application 140 that allows a user to interact with the instrumentation analysis system 100. In an embodiment, the client application 140 is an internet browser, which may include client side code (e.g., Java Script) for accessing the instrumentation analysis system 100. In other embodiments, client application 140 is a proprietary application developed for interacting with the instrumentation analysis system 100.

The reporting system 150 can be a conventional computer system (e.g., a desktop or laptop computer), a tablet, or a device having computer functionality such as a personal digital assistant (PDA), a mobile telephone, a smart phone or another suitable device. The reporting system 150 interacts with instrumentation analysis system 100 via a network. The network may comprise any combination of local area and/or wide area networks, using both wired and/or wireless communication systems. In one embodiment, the network uses standard communications technologies and/or protocols.

The instrumentation analysis system 100 may be hosted on a computing system that includes one or more processors, memory, secondary storage and input/output controller. The computing system used for hosting the instrumentation analysis system 100 is typically a server class system that uses powerful processors, large memory, and fast input/output systems compared to a typical computing system used, for example, as a reporting system 150.

In an embodiment, data from several development systems 120 may be consolidated, for example, by a server and the combined data sent to the instrumentation analysis system 100. For example, an enterprise may install a server that receives data stream internally from different development systems 120 and sends the combined data in a batch form to the instrumentation analysis system 100 periodically. This allows efficiency of external communication from the enterprise. However this configuration may result in delay in communicating information to the instrumentation analysis system 100 and the corresponding delay in reporting data by the reporting system 150.

Associating Dimensions with Data Streams

A data stream may be identified by using a set of coordinates representing values of dimensions associated with data streams. A dimension refers to a property of data streams that can take one of a set of values. Each data stream may be associated with a value for a dimension. For example, a dimension can be a source of a data stream or a metric name associated with a data stream. A source of a data stream may be identified by a server name, a service name, and so on. Examples of metric names are cpu (central processing unit) load, cache misses, cache hits, and so on. A value of a dimension is also referred to as a coordinate value of the data stream. A coordinate value may be represented as a metadata attribute stored in the metadata store 230. Given the two dimensions of source and metric, a data stream may be identified by providing the two coordinates representing the source and the metric, for example, (server1, cpu_load) or (server2, memory_usage).

A data stream may be characterized by multiple dimensions (i.e., more than the two dimensions described above, i.e., source and metric name.) For example, if each server has multiple cpus, a dimension cpu_id may be included. Accordingly, each data stream obtained from a system may be characterized by (source_id, cpu_id, metric_name), i.e., a source identifier, a cpu identifier, and a name for the metric. Examples of data streams identified using three coordinates include (server1, cpu1, load), (server1, cpu2, load), (server2, cpu1, load), (server2, cpu2, load) and so on.

As another example of a dimension, a system may define customer name as a dimension. The name of the customer may be reported by the instrumented software, for example, based on the configuration parameters of the instrumented software executing on a development system 120. The customer name may be specified using a system property to the instrumented software. The instrumented software includes the customer name when it identifies a data stream associated with that particular customer. The ability to associate a data stream with a customer allows the instrumentation analysis system to perform customer specific analysis, for example, report on usages of systems for each customer, identify customers reporting more than a threshold number of errors and so on.

A data stream may be obtained from instrumented software or may be generated as a result of execution of blocks of a data stream language program within the instrumentation analysis system. A data stream may also comprise data stored in the instrumentation analysis system, for example, in a data store (such as a time series data store 260 described herein.)

System Architecture of Instrumentation Analysis System

Figure 2:
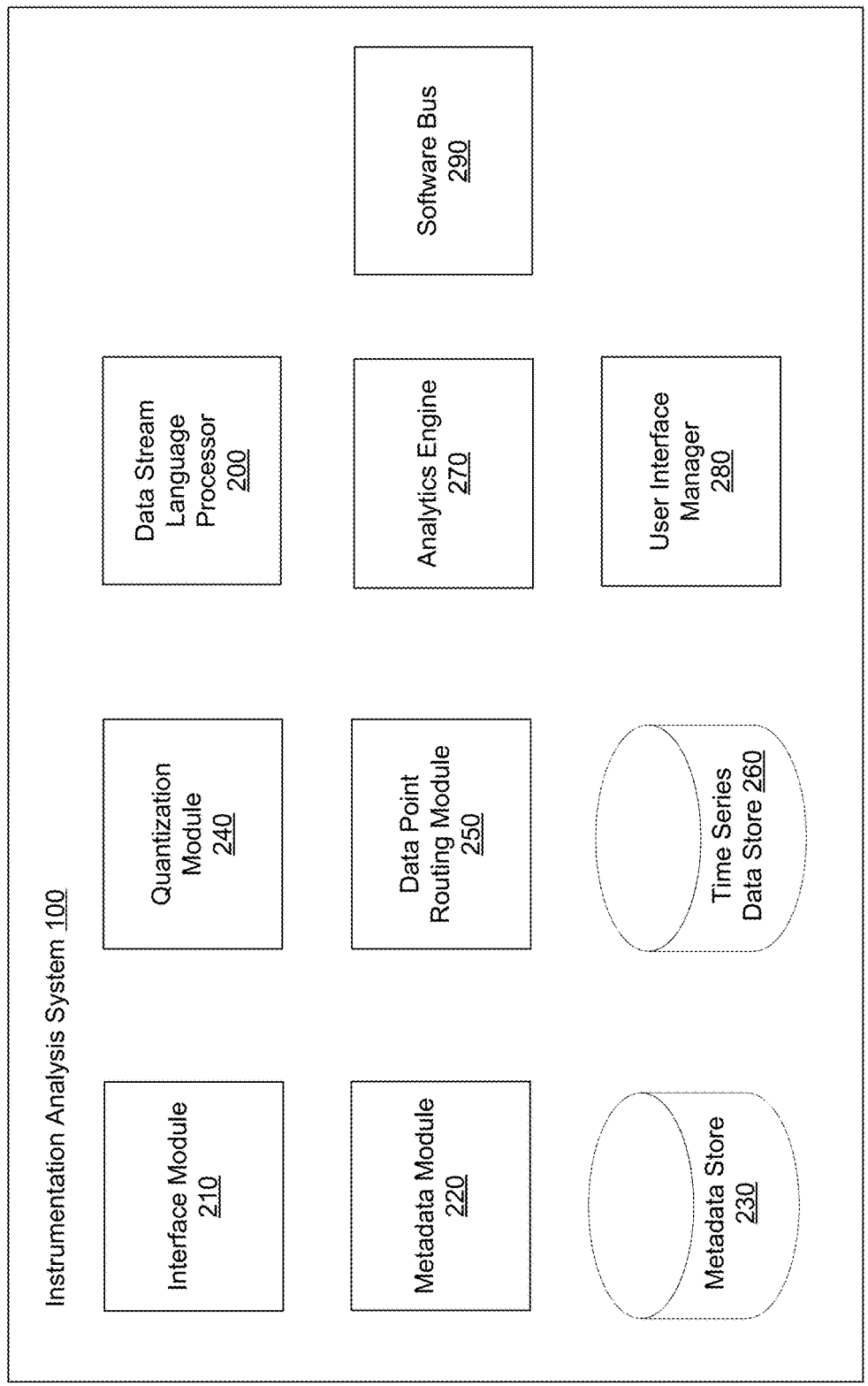
FIG. 2 shows the architecture of a system for executing a data stream language program for processing data streams received from instrumented software, according to an embodiment.

FIG. 2 shows the architecture of a system for executing a data stream language program for processing data streams received from instrumented software, according to an embodiment. The instrumentation analysis system 100 includes an interface module 210, a quantization module 240, metadata module 220, metadata index 230, a data point routing module 250, an analytics engine 270, a user interface manager 280, a data stream language processor 200, a time series data store 260, and software bus 290. In other embodiments, the instrumentation analysis system 100 may include other modules not described herein. Functionality indicated as provided by a particular module may be implemented by other modules instead.

The interface module 210 receives requests from external systems, for example, development systems 120 that communicate with the instrumentation analysis system 100. The interface module 210 supports various application programming interfaces (APIs) that external systems can invoke. The interface module 210 can receive and process data provided by applications 130 that are instrumented using functionality provided by different vendors, so long as the instrumented code sends the information in a format that can be processed by the interface module 210.

The interface module 210 receives data in the form of data streams from one or more development systems 120. In an embodiment, the interface module 210 receives data and represents it as tuples. A tuple of data received by the interface module 210 comprises various elements including a metric identifier, for example, a name of the metric corresponding to the tuple and a value of the metric. The tuple of data received may further comprise other elements, for example, a timestamp corresponding to the time that the data was captured by the application 130 sending the data, one or more properties associated with the data.

In an embodiment, the timestamp associated with a tuple represents the time that the data value was received by the instrumentation analysis system 100. The properties associated with the data may be provided in the form of name, value pairs. These properties may provide additional information describing the data received, for example, information describing the source of the data such as a host name, server name, device name, or service name associated with the source, a method or function name associated with the data, an application instance identifier, and so on.

In an embodiment, the interface module 210 generates and assigns an identifier to records received by the interface module 210. The identifier is referred to herein as a time series identifier (also referred to herein as a TSID or tsid). A unique time series identifier is assigned to all tuples matching a metric name and a set of properties received with the tuple. Accordingly, a tuple (metric name, properties, metric value, timestamp) gets mapped to a tuple (tsid, metric value, timestamp). For example, if a tuple provides a metric name m1, and a hostname h1, all tuples with metric name m1 and hostname h1 are assigned the same time series identifier. Accordingly, the tsid uniquely identifies all tuples of a data stream received by the instrumentation analysis system 100.

The quantization module 240 processes data values received so as to transform an input time series of data in which data is available at arbitrary time intervals to a time series in which data is available at regular time intervals. For example, the data values received in an input time series may occur at irregular interval, however, the quantization module 240 processes the data of the time series to generate a time series with data occurring periodically, such as every second, or every 5 seconds, or every 15 seconds, and so on. This process is referred to herein as quantization of the time series. In an embodiment, the interface module 210 creates multiple threads or processes, each thread or process configured to receive data corresponding to a data stream. Each thread or process invokes the quantization module 240 to perform quantization of the data received for each data stream for each time interval.

The metadata module 220 receives and stores metadata information describing various data streams received from the development systems 120. In an embodiment, the metadata stored in the metadata module 220 is received from a user, for example, a system administrator interacting with the instrumentation analysis system 100 using the administration system 160.

The metadata may be represented as name-value pairs. In an embodiment, the metadata is represented as metadata objects, each object defining a set of properties that may be represented as name-value pairs. A set of data streams may be associated with the metadata object. Accordingly, all properties represented by the metadata object are associated with each data stream that is associated with the metadata object.

The metadata datastore 230 stores the metadata objects and their associations with the data streams. The metadata datastore 230 stores an identifier (ID) for each metadata object and the properties represented by the metadata object. In an embodiment, each data stream is associated with a time series identifier that uniquely identifies the data stream. The metadata datastore 230 stores an index that maps each metadata object to a set of time series identifier values. The metadata store 230 may receive instructions to modify a metadata object. For example, the metadata store 230 may receive instructions to modify, add or delete some properties represented by a metadata object. Alternatively, the metadata store 230 may receive instructions to modify the mapping from a metadata object to a data stream. For example, the metadata store 230 may receive instructions to associate a data stream with a metadata object or delete an association between a metadata object and a data stream.

In an embodiment, the metadata store 230 is represented as a relational database but may be represented as any other type of database or data store. For example, the metadata store 230 may be a relational database storing tables that map metadata object IDs to time series IDs identifying data streams. Other database tables may store the properties associated with each metadata object as a mapping from metadata object ID to each property represented as a name-value pair.

The user interface manager 280 renders the user interface for allowing users to specify the parameters of a data stream language program and to present results of execution of the data stream language program. The user interface manager 280 may display real-time results of a data stream language program as one or more charts that are periodically updated as the data of the data streams is received. The user interface manager 280 also presents a user interface that allows users to specify a data stream language program visually rather than textually. Examples of screenshots of user interfaces presented by the user interface manager 280 are described herein.

The time series data store 260 stores data received from various sources, for example, development systems 120. The time series data store 260 is also referred to herein as time series database or TSDB. In an embodiment, the time series data store 260 also stores the time series data after the data is quantized. The time series data store 260 may also store rollup data for each time series. The time series data store 260 also stores results of various analytics requests, for example, results of various reports requested by user. The analytics engine 270 computes results for certain reports, for example, moving averages over intervals of time by combining data stored in the time series data store 260 with new data obtained as data stream from various sources.

The software bus 290 provides a mechanism for modules to provide data of data streams to other modules. A data stream language program may send a data stream to the software bus 290. Other modules, for example, fetch module, find module, window module, and so on can read the data from the software bus 290 and perform further processing on the data. For example, a data stream output of a data stream language program published on the software bus 290 may be identified by a find block of another data stream language program executing as a job.

The data stream language processor 200 executes programs specified using the data stream language. The data stream language processor 200 receives a data stream language program, parses the data stream language program to validate the program. The data stream language processor 200 generates a representation of the data stream language program and executes the data stream language program using the representation.

The requests specified using the data stream language is a query based on the metadata associated with data received from various development systems 120. The data stream language supports various types of analytic functions, for example, aggregations and transformations. The data stream language provides the ability to compose various functions including aggregations and transformations in various ways. In an embodiment, the data stream language processor 200 parses programs specified using the data stream language, generates an executable representation of the program, and executes the generated representation.

Data Stream Language

A program specified using the data stream language comprises units of computation called blocks. Each block is associated with a particular processing or computation performed by the data block. Each block may also have one or more input ports and one or more output ports. A block receives input via an input port, performs certain computation using the data and sends the result of the computation to the output port. This process is repeated at a pre-specified periodicity. Accordingly, an input port acts as a mechanism to provide data to the block and an output port acts as a mechanism to output data of the block.

In an embodiment, each block is associated with a type of the block. The type of the block determines the computation performed by the block. The types of blocks supported by the data stream language include a find block, a fetch block, a statistical computation block, a threshold block, and so on. A block may be associated with certain configuration parameters. For example, a find block may take an expression as input. A data stream language program includes instances of a type of block. For example, a find block with a particular search expression is an instance of the find block that is included in a data stream language program.

In an embodiment, an input port of a block is identified with character "T" and an output port is identified with character "!". Other embodiments may identify the input/output ports using other syntax. For example, if a block B1 has input ports in1 and in2, a specific input port (say in2) may be identified as "B1?in2". Similarly, if block B1 has output ports out1 and out2, a specific output port (say out2) can be specified as "B2!out2". If a block has a single input/output port, the data stream language program may not identify the port. For example, if block B2 has a single input port, the input port may be referred to as "B2". Similarly, if block B2 has a single output port, the output port may be referred to as "B2".

Two blocks may be connected by specifying that the output of one block is provided as input of the other block. Accordingly, a data stream language program can be considered a network of blocks. In an embodiment, the connection between two blocks is specified using an arrow between the two blocks. For example, if B1 and B2 both have a single input port and a single port, "B1→B2" specifies that the output of B1 is provided as input of block B2. Similarly, if B1 has two output ports out1 and out2 and B2 has two input ports i1 and in2, the out1 port of B1 may be connected to the in2 port of B2 by the expression "B1!out1→B2?in2".

The data stream language processor 200 may execute multiple jobs based on a data stream language program. Each job may be associated with a start time, an end time, and a periodicity. Accordingly, the job is executed from the start time until the end time at intervals specified by the periodicity. The periodicity specifies the rate at which data is processed by the data stream language program. A user may specify different jobs for execution based on the same data stream language program, each job associated with different start time, end time, and periodicity.

Figure 3:
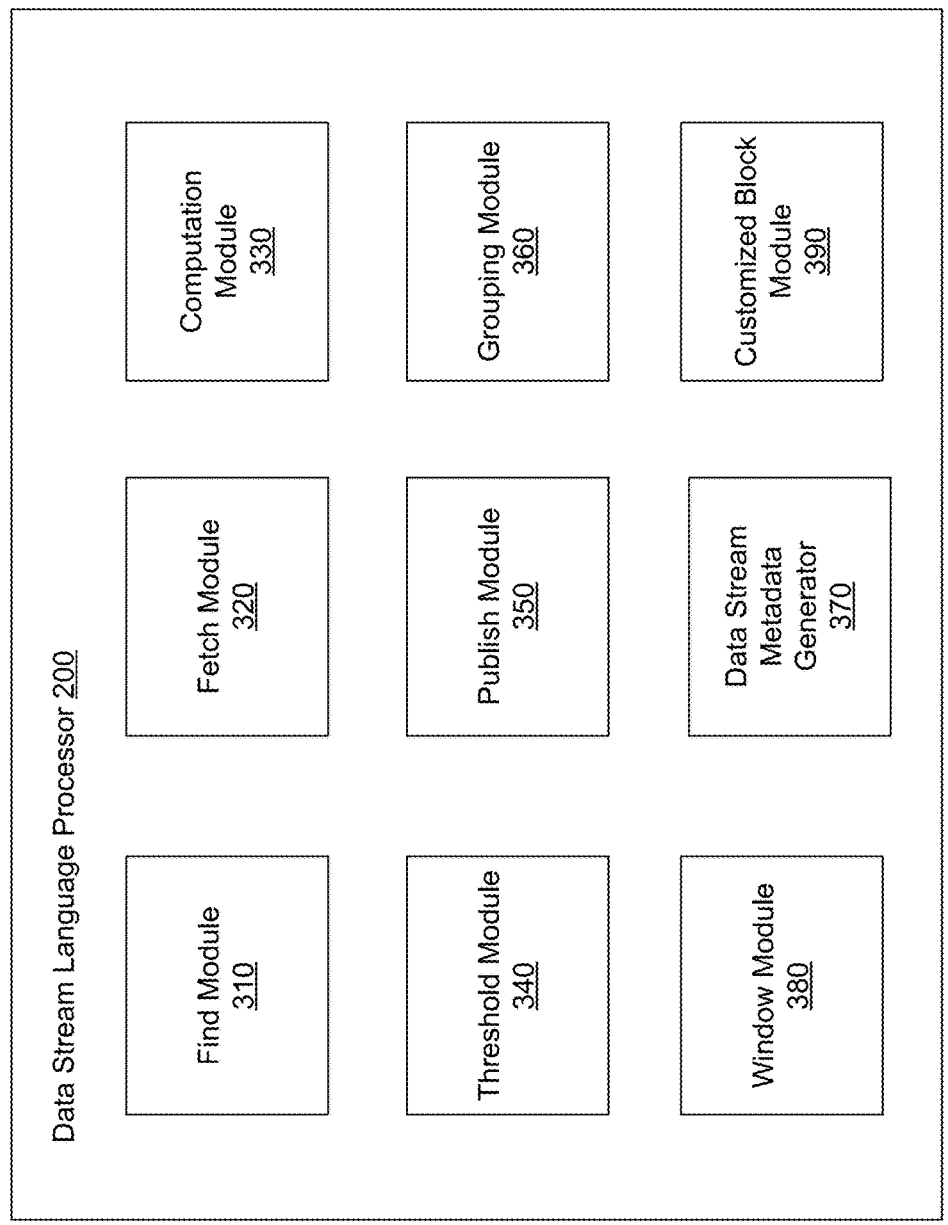
FIG. 3 shows the architecture the data stream language processor for processing blocks of data stream language programs, according to an embodiment.

FIG. 3 shows the architecture the data stream language processor for processing blocks of data stream language programs, according to an embodiment. As shown in FIG. 3, the data stream language processor 200 includes modules for processing various types of blocks of the data stream language. Accordingly, the data stream language processor 200 includes a find module 310, a fetch module 320, a computation module 330, a threshold module 340, a publish module 350, a grouping module 360, a window module 380, a data stream metadata generator 370, and a customized block module 390. Other embodiments may include more or less modules than those shown in FIG. 3. Certain modules are not illustrated in FIG. 3, for example, a parser. The details of each module are further described herein along with details of the types of blocks processed by each module.

The find module 310 executes the find block to identify a set of data streams for processing by the rest of the data stream language program. The fetch module 320 fetches data from the identified data streams and provides the data for processing by subsequent blocks of the data stream language program. The computation module 330 performs statistical computations specified in the data stream language program, for example, mean, median, sum, and so on. The threshold module 340 compares data of an incoming data stream with a threshold value to determine if the incoming data exceeds certain bounds. The threshold value specified for comparison may dynamically change, for example, a threshold value may be specified as a one hour moving average of the input data stream scaled by certain factor. The publish module 350 executes the publish block that provides the output of the blocks preceding the publish block to various receivers including a user interface (e.g., a dashboard) for presenting the results, for storing in a database, or for providing to other blocks for further processing. The grouping module 360 performs grouping of data of input data streams to generate a set of result data streams corresponding to each group. The groups may be based on one or more attributes specified with the grouping command, for example, groups of data streams from each data center. The data stream metadata generator 370 generates metadata representing result data streams generated as a result of executing data stream language programs and stores the metadata in the metadata store 230 for allowing other components of the instrumentation analysis system 100 to use the result data stream. The customized block module 390 processes user defined blocks (customized blocks) in a data stream language program.

Example Data Stream Language Program

Figure 4:
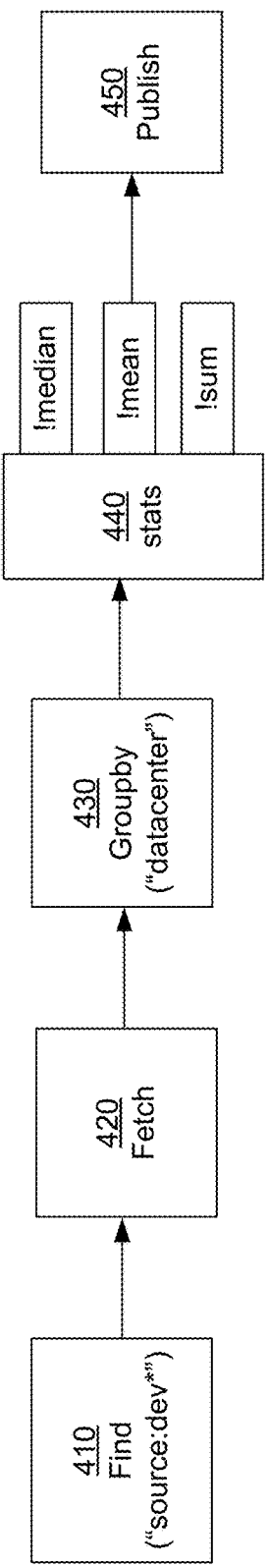
FIG. 4 shows an example of a data stream language program for illustrating features of the data stream language, according to an embodiment.

FIG. 4 shows an example of a data stream language program for illustrating features of the data stream language, according to an embodiment. FIG. 4 represents the data stream language program in terms of blocks. The data stream language program shown in FIG. 4 can be specified as follows.

find("source:analytics*")→fetch
    →groupby("datacenter")
    →stats !mean
    →publish The first block of the above data stream language program is a find block 410 that takes a string parameter that specifies a search expression. The find block finds a set of data streams received by the instrumentation analysis system 100 that satisfy the search expression. For example, the find block 410 takes search expression "source:dev" that identifies all data stream that the "source" metadata attribute value "dev." For example, an enterprise may associated all development systems with source value "dev." The output of the find block is provides as input to a fetch block 420.

The fetch block 420 retrieves data from the data streams identified by the find block. The fetch block receives data at a pre-specified periodicity. The fetch block may receive real time data of data streams received by the interface module 210 and quantized by the quantization module 240. The fetch block 420 may also receive data of data streams stored in the time series data store 260. The output of the fetch block 420 is provided as input to the groupby block 430.

The groupby block 430 takes names of one or more attributes of data streams as input. The groupby block 430 groups the data streams by the specified attributes. As shown in the example above, the groupby block 430 takes a "datacenter" attribute as input and groups the data streams by their datacenter value. Accordingly, data of all data streams having the same data center is grouped together. The groupby block 430 outputs a data stream corresponding to each value of data center. The output of the groupby block 430 is provided as input to the stats block 440 (which is a type of statistical computation block).

The stats block 440 has multiple outputs, for example, mean, median, sum, and so on. Each output port provides values based on the type of computation specified by the name of the output. The stats block 440 computes the mean value for each group of data streams received as input from the groupby block 430. Accordingly, the stats block 440 determines the mean of data received from data streams of each datacenter. As shown in FIG. 4, the mean output port of the stats block provides input to the publish block 450.

The publish block 450 may be configured to publish the received input on a dashboard. The publish block may be configured to publish the data on the software bus 290. The software bus 290 provides the data to all other modules of the instrumentation analysis system 100. The data stream language processor 200 executes the various blocks specified above at a periodicity specified for the data stream language program.

Overall Process of Execution of a Data Stream Language Program

Figure 5:
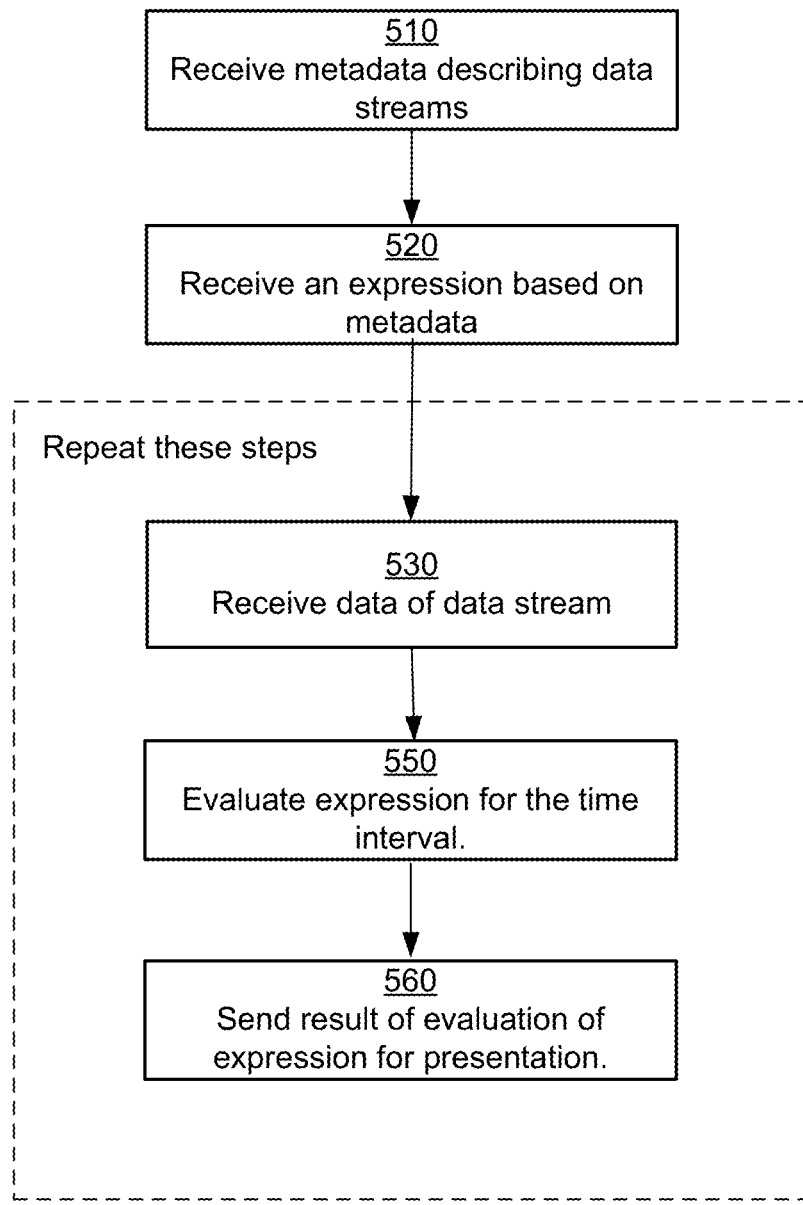
FIG. 5 shows the overall process of an instrumentation analysis system for processing data received from data streams based on a data stream language program, according to an embodiment.

FIG. 5 shows the overall process of an instrumentation analysis system for processing data received from data streams based on a data stream language program, according to an embodiment. The metadata module 220 receives 510 metadata describing data streams. The metadata definition is received independent of the data of the data streams themselves. For example, the data stream may simply provide tuples comprising a data value and a timestamp associated with the data value without providing any properties (for example, name-value pairs.) The metadata module 220 receives the properties describing the data streams from a source different from the source providing the data stream. For example, the data streams are provided by instances of instrumented software that is executing on development system 120, whereas the metadata definition may be provided by a system administrator via the administration system 160.

The analytics engine 270 receives 520 a data stream language program using the metadata attributes describing data streams. The data stream language program may represent a set of instructions provided to the instrumentation analysis system 100 to generate reports describing the instrumented software and provide the results in real-time, i.e., as the data of the data streams is received.

The instrumentation analysis system 100 repeats the following steps as data of various data streams is received by the instrumentation analysis system 100 from various development systems 120. The interface module 210 receives 530 data of different data streams. In an embodiment, the interface module 210 waits for a fixed interval of time, for example, 1 second or a few seconds and collects data received from different data streams. In an embodiment, the quantization module 240 performs quantization of the data for each incoming data stream for each time interval. Accordingly, data from each data stream is aggregated into a single value associated with the data stream for that time interval.

The analytics engine 270 executes 540 the data stream language program based on the data of the data streams for the time interval. If the data is quantized for each data stream, the analytics engine 270 evaluates 540 the data stream language program using the quantized values from each data stream. The data stream language program may include a publish block that causes the analytics engine 270 to send the result(s) of evaluation of the data stream language program for presentation, for example, to a user interface.

The data stream language program may generate one or more data streams. The analytics engine 270 also stores the data streams generated as a result of evaluation of the data stream language program, for example, in the time series data store 260. The analytics engine 270 creates one or more new data streams (or time series) representing the results of the data stream language program. The new data streams are stored in the time series data store 260. This allows the result of the data stream language program to be used as input to other data stream language program. For example, a data stream language program may generate data representing the $95^{th}$ percentile of values received from a plurality of data streams. The result of the data stream language program may be stored in the time series data store 260 as a new data stream. The analytics engine 270 may further execute another data stream language program that computes a moving average value based on the generated data stream.

User Interface for Generating Reports Using Data Stream Language Programs

In some embodiments, the instrumentation analysis system 100 provides a user interface that generates data stream language programs for the end user interested in viewing the reports based on data streams. The user is provided with a user interface that hides the complexity of the data stream language. The user interface provided by the instrumentation analysis system shows various widgets that allow users to take actions such as select the metrics for generating reports, performing rollups, grouping data streams and so on. The user interface plots graphs showing results of computation of data stream language programs as values plotted against time. The values of the result data stream are presented by the user interface for the most recent time window that is continuously moving.

Figure 6:
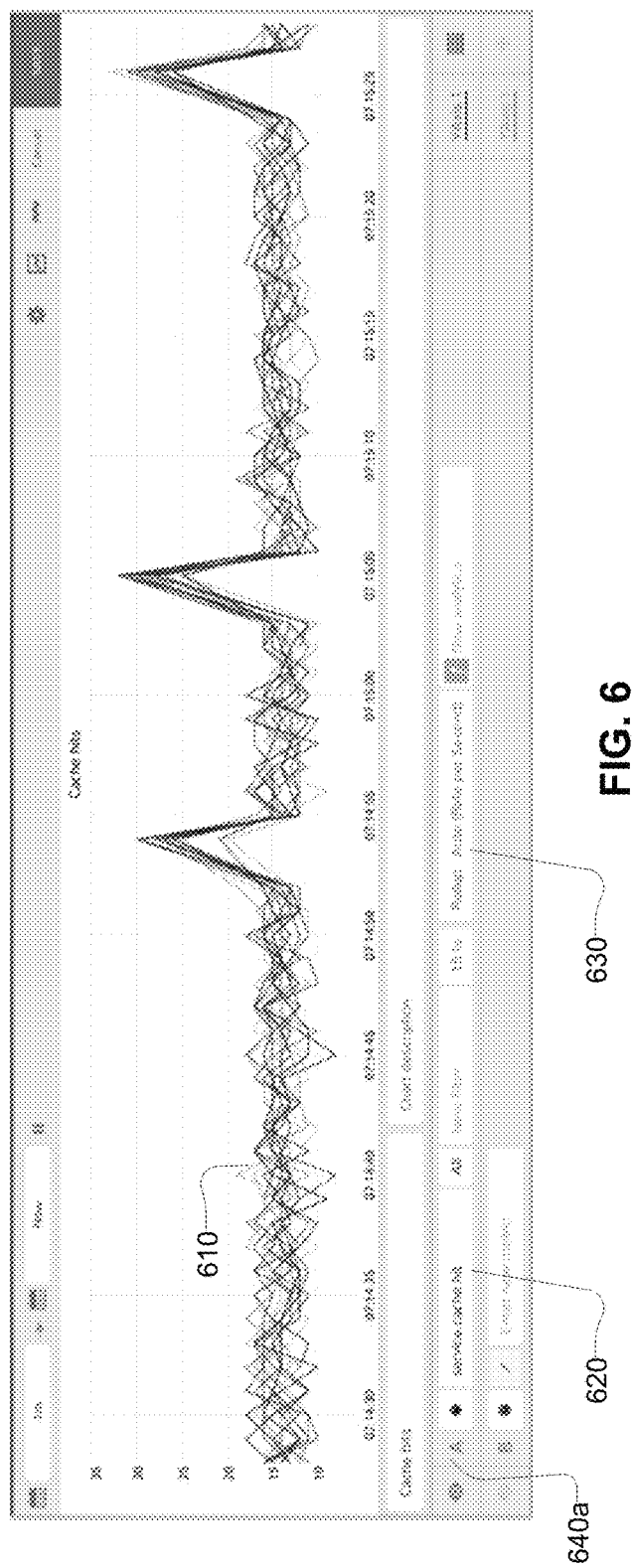
FIG. 6 shows a screenshot of a user interface displaying result of execution of a data stream language program that shows data streams received by the instrumentation analysis system, according to an embodiment.

FIG. 6 shows a screenshot of a user interface displaying result of execution of a data stream language program that shows data streams received by the instrumentation analysis system, according to an embodiment. The screenshot shows several charts 620 displaying data streams representing metric 620 service.cache.hits. The metric represents cache hit values received from instrumented software executing on development systems 120. The values are rolled up to a time interval of 1 second. Accordingly, the cache hits values received in each time interval of one second are added together. There can be a large number of services reporting the metric service.cache.hits and accordingly a large number of charts 620 is displayed. FIG. 6 shows various widgets that allow a user to take actions, for example, select the metric that is reported by the user interface, perform rollups.

A data stream language program comprising a set of instructions for generating a set of output data streams (for example, instructions including a filter expression, one or more aggregation/transformation function, and so on) is referred to as a plot line. A plot line is associated with a label 640. The user interface allows users to define a plurality of plot lines and add a new plot line as an expression based on results of the plurality of plot lines. The user interface manager 280 configures a user interface that comprises a chart representing a plot line. In an embodiment, the user interface receives and displays specification of a plurality of plot lines by display the chart for only one of them, for example, the last plot line specified by the user, or a plotline selected by the user.

Figure 7:
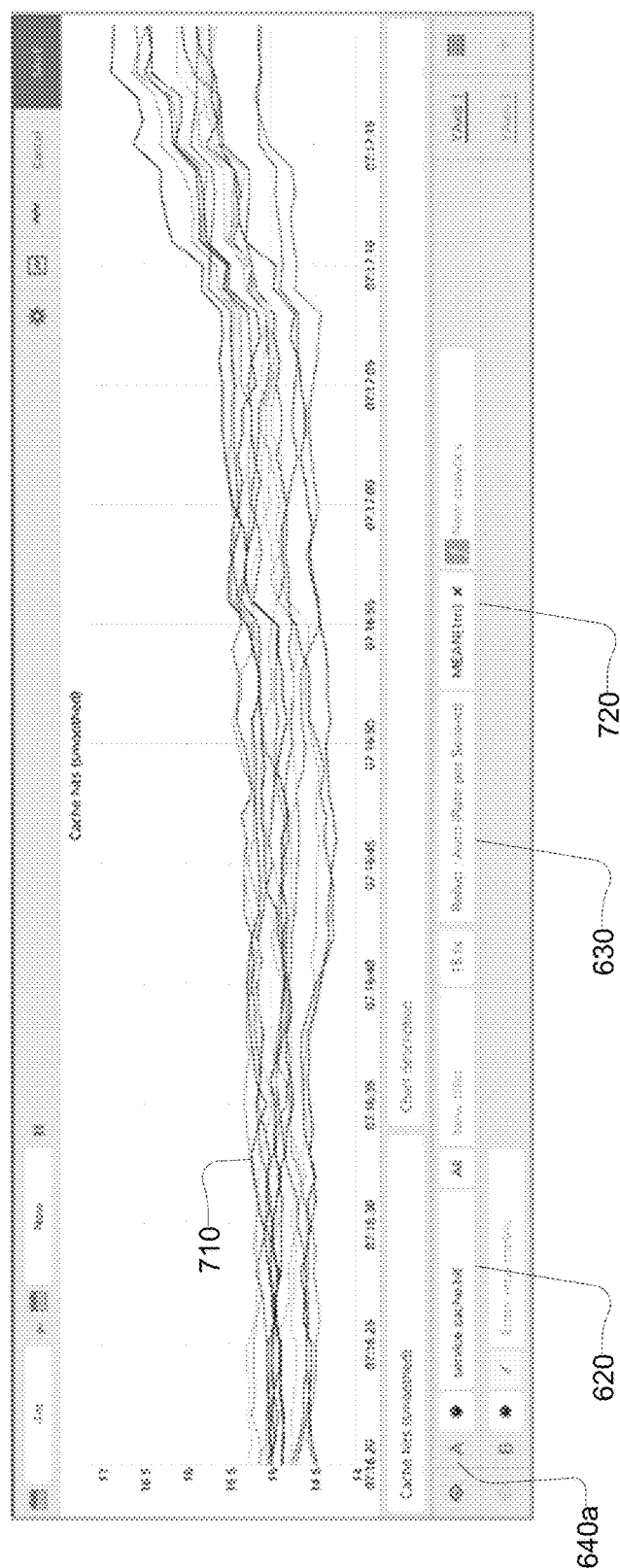
FIG. 7 shows a screenshot of a user interface displaying result of execution of a data stream language program showing 1 minute average of data of data streams received by the instrumentation analysis system, according to an embodiment.

FIG. 7 shows a screenshot of a user interface displaying result of execution of a data stream language program showing 1 minute average of data of data streams received by the instrumentation analysis system, according to an embodiment. FIG. 7 shows a widget that allows a user to specify certain computations to be performed on the data streams. Specifically, FIG. 7 shows a widget 720 that computes a one minute mean for each data stream. As a result the charts 710 are smoother than the charts shown in FIG. 6. However the number of charts 710 shown in FIG. 7 is same as the number of charts 710 shown in FIG. 6.

Often enterprises have a very large number of development systems 120. Each development system may execute multiple services, each service reporting the metrics. As a result, the number of charts displayed in FIGS. 6 and 7 can be very large. A user can gain better insight into the data reported by data streams by grouping the data streams as shown in FIG. 8.

Figure 8:
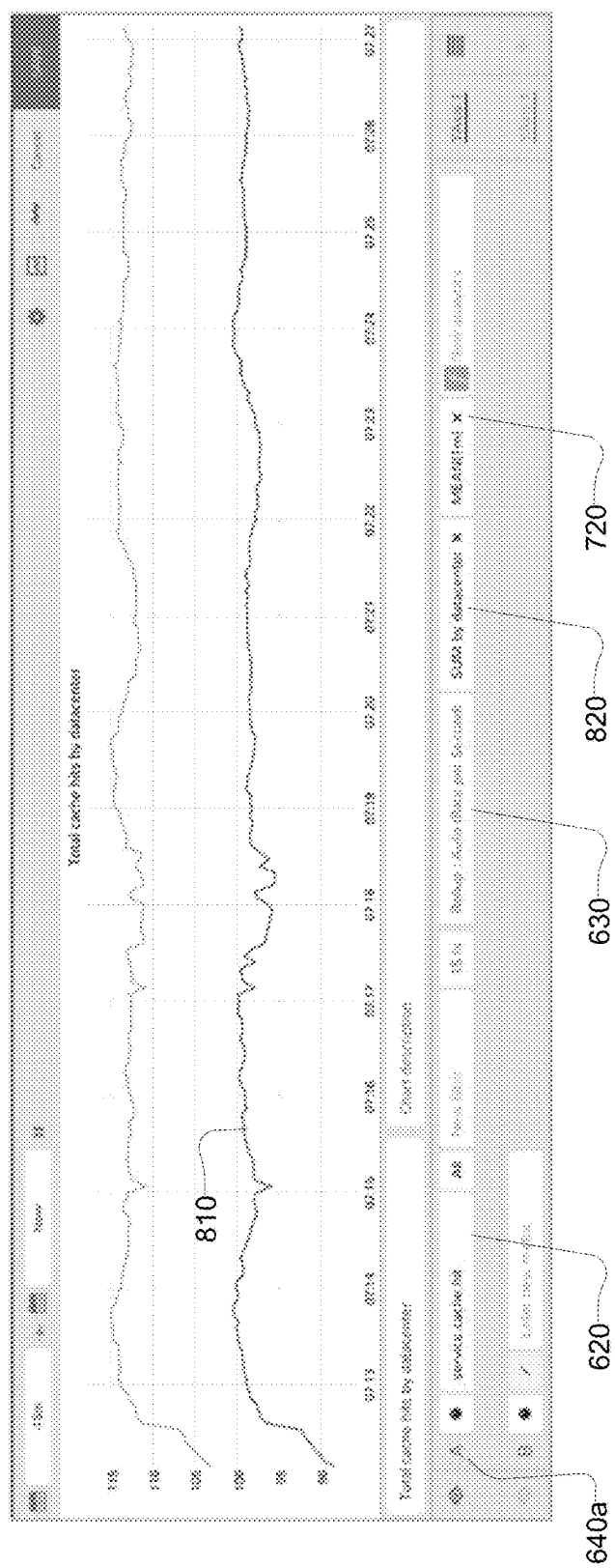
FIG. 8 shows a screenshot of a user interface displaying result of execution of a data stream language program showing sum of data streams grouped by data center, according to an embodiment.

FIG. 8 shows a screenshot of a user interface displaying result of execution of a data stream language program showing sum of data streams grouped by data center, according to an embodiment. FIG. 8 shows widget 820 that allows specification of attribute by which the data streams are grouped and the aggregation operation performed for each group. As shown in FIG. 8, the user has requested grouping by data center and performing the sum operation for each group. Assuming there are only two data centers, the number of charts is reduced to two. Each chart 810 shows the sum of data values of data streams received from a particular data center.

Figure 9:
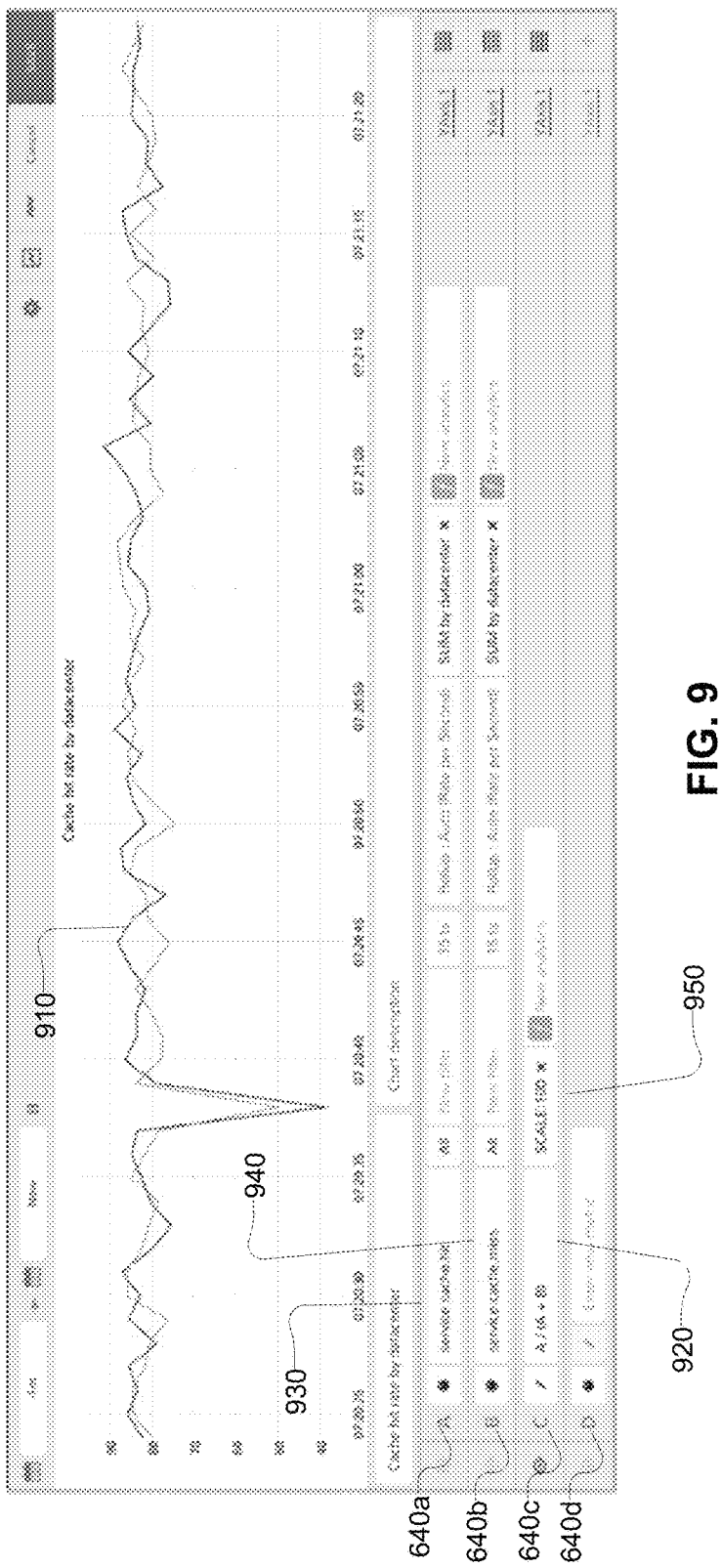
FIG. 9 shows a screenshot of a user interface displaying result of execution of a data stream language program including a customized macro block that determines ratio of cache hit rate and sum of cache hit rate and miss rate for data streams grouped by datacenters, according to an embodiment.

FIG. 9 shows a screenshot of a user interface displaying result of execution of a data stream language program including a customized macro block that determines ratio of cache hit rate and sum of cache hit rate and miss rate, for data streams grouped by datacenters, according to an embodiment. As shown in FIG. 9, a user refers to data streams reporting metric service.cache.hit using the widget 930 as A. The user further refers to data streams reporting the metric service.cache.miss using the widget 940 as B. The user defines the computation A/(A+B) as the ratio of the cache hit with respect to the sum of cache hits and cache misses. The user further specifies using widget 950 that the value A/(A+B) computed should be scaled by a multiple of 100. This computation is performed for each group of data streams based on datacenter. Accordingly, a chart 910 is generated for each data center reporting real time values of cache hit ratio for all data streams received from the data center.

The screenshot shown in FIG. 9 shows three plot lines with data stream language program specifications, each plot line associated with a label. The plot line 640*a* is associated with label A, the plotline 640*b* associated with label B, and plotline 640*c* associated with label C. The user interface manager provides widgets for receiving specification of a fourth plotline 640*d* that is associated with label D.

Figure 10:
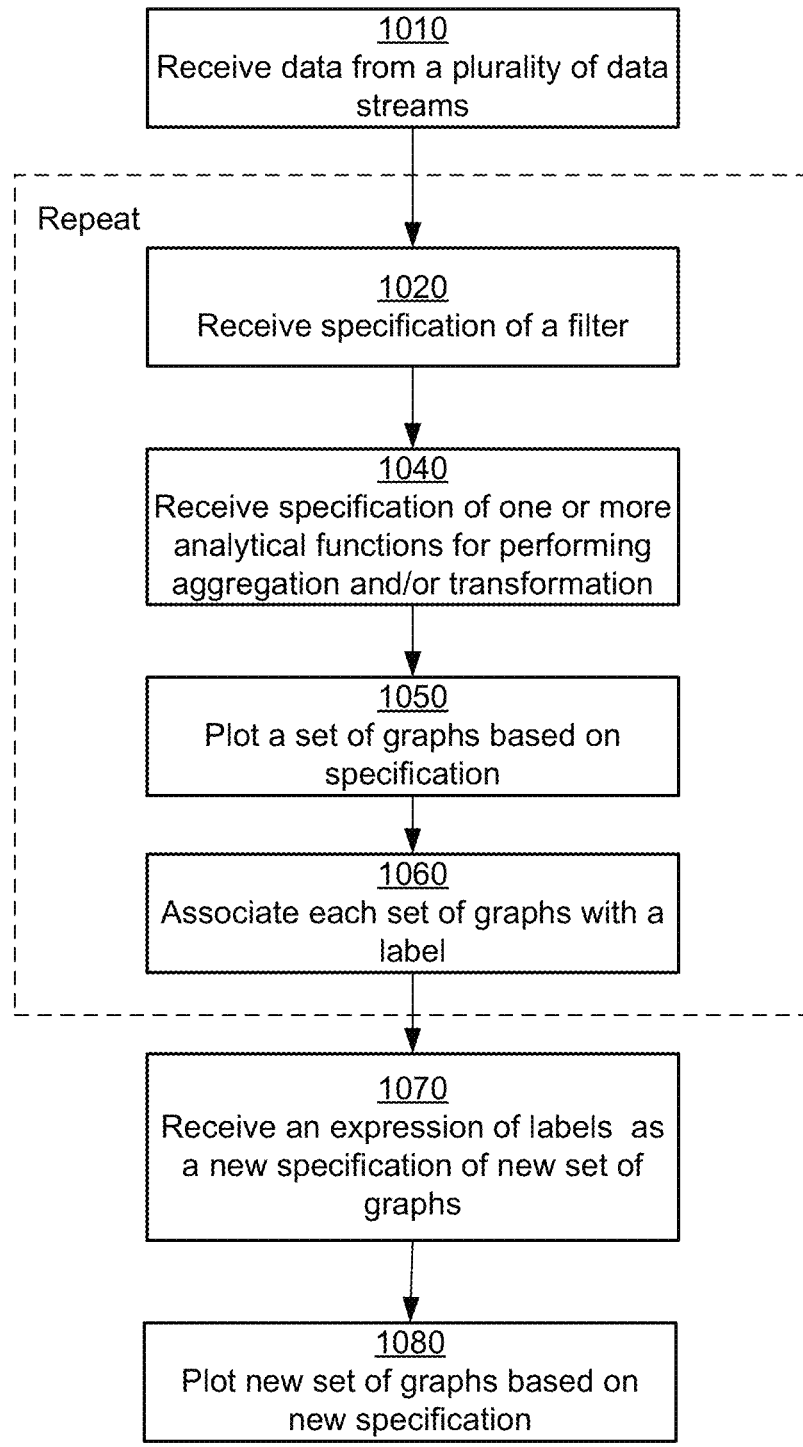
FIG. 10 shows the process of receiving specification of a data stream language program based on a user interface of the instrumentation analysis system, according to an embodiment.

FIG. 10 shows the process of receiving specification of a data stream language program based on a user interface of the instrumentation analysis system, according to an embodiment. The interface module 210 receives 1010 data from a plurality of data streams from one or more external sources of data.

The user interface manager 280 configures for presentation, a user interface for allowing a user to perform user interactions for specifying a data stream language program. In an embodiment, the user interface manager 280 generates a markup language document that comprises information describing a user interface and send the markup language for display to a user via a client device. The client device renders a user interface based on the received markup language document and presents it via a display of the client device. The user interface receives user interactions and send information describing the user interactions to the user interface manager 280. This process is repeated as long as the user performs user interactions with the instrumentation analysis system 100. For example, the steps 1020, 1030, 1040, 1050, and 1060 may be repeated multiple times. Each set of steps (1020, 1030, 1040, 1050, and 1060) specifies a data stream language program called a plot line and that generates a set of output data streams that may be presented to the user as graphs 610, 710, and so on.

In an embodiment, the user interface manager 280 configures a user interface including one or more widgets for receiving expressions. The widget may be configured to receive a text description of the expressions. Alternatively the widget is expression builder that provides visual tools for building an expression.

The user interface manager 280 configures a user interface with a widget for receiving a filter expression. An example of the widget for specifying a filter expression is widget 720 in FIG. 7. The user interface manager 280 receives 1010 a filter expression that evaluates to a subset of data streams received by the instrumentation analysis system 100. In an embodiment, the filter expression specifies values of one or more names of metrics of data streams.

The user interface presented by the user interface manager 280 allows users to specify name or names of metrics by typing in as text values or by selecting the metric from a catalog of all metrics available for selection. The user can specify a data stream language program processing data streams having the specified metric names. In an embodiment, if the user interface manager 280 presents a search field to the user for searching metric names from the catalog. If the user starts typing into the search field, the user interface manager 280 shows a list of data streams (also referred to as time series) and metrics that match, and allows the user to select a data stream or metric to see additional details of the time series/metric. If a data stream was previously associated with a metadata attribute or tag, the user interface manager allows the user to search for the data stream using the tag. Accordingly, if the user interface manager 280 receives a tag, the user interface manager 280 presents to the user all data streams matching the tag.

The user interface further displays a widget to allow users to specify filters to the selected data streams based on dimensions, properties or tags of the data streams. These dimensions, properties or tags may be stored as metadata attributes in the metadata store 230. The dimensions and properties are formatted as key/value pairs, and the user provides the name of the key. Once the user specifies a key, the user interface manager 280 presents to the user, a list of valid values associated with that key for selection. The user may provide a name of a tag for filtering the data streams by the tag.

In an embodiment, the filter expression specifies one or more regular expressions based on names of metrics of data streams. For example, the regular expression, cpu.* matches cpu.idle, cpu.busy.high, cpu.busy.low, and so on. Accordingly, the specified data stream language program causes the data stream language processor 200 to select a subset of received data streams such that the filtered data streams have these metric names or expressions.

The user interface configured by the user interface manager 280 further includes a widget for receiving a specification of an analytic computation or function. The analytic function transformation or aggregation function. An analytic computation is a mathematical function that is applied to a collection of data points. For example, a mean is computed over a collection of data points by dividing the sum of the collection by the number of data points in the collection.

The user interface manager 280 receives an indication whether the analytic function is a transformation or aggregation. If the user interface manager 280 receives an indication that an analytic computation is a transformation, the user interface manager 280 applies the analytic function to a plurality of data values from the same time series, accumulated over some period of time. The output of the computation therefore contains the same number of time series as the input to the computation. For example, a moving one hour average applied to ten individual time series results in ten output time series.

If the user interface manager 280 receives an indication that an analytic computation is a transformation, the user interface manager 280 applies the analytic computation to a plurality of data values from different time series for the same instant of time. The output of the computation typically contains fewer time series than the input to the computation. The criterion used to identify the collections is the optional group-by field. If a group-by field is not specified, all time series (obtained by applying the filter) are aggregated as a single collection, yielding a single output time series. Otherwise, the data stream language processor 200 looks up metadata of the input time series for the properties named by the group-by criterion, and places time matching the specified in the same collection. For example, the user interface manager may receive a specification of analytic computation of the average CPU load, grouped by a web service instance type as a mean computation as an aggregation with the web service instance type as the group-by criterion.

The user interface may receive one or more analytic functions for each plot line. For example, an analytic function may be specified as a transformation and another analytic function specified as an aggregation. FIG. 8 shows a plot line labeled A specifying an aggregation function 820 (sum by datacenter) and a transformation function 720 (mean(1m), i.e., a moving average computed over 1 minute moving time window).

The user interface manager 280 provides the data stream program specified by the user via the user interface to the data stream language processor 200. The user interface manager 280 receives a set of data streams as a result of computation of the data stream program and sends information describing a set of graphs for display on a screen of a client device. The client device plots 1050 the set of graphs. The graphs are continuously updated as new data values are received 1010 by the instrumentation analysis from the developments systems 120 or any source of the input data streams. The graphs plotted 1050 may be updated periodically, or every time new data values of the input data stream are received, or every time a set of data values of the input data stream are received.

The user interface manager 1060 also receives labels associated with each plot line. In an embodiment, the user interface manager 1060 or the data stream language processor generates a label for each plot line. The label may be generated before the user specifies the various components of the data stream language program for the plot line. For example, FIG. 9 shows the label D for plotline 640*d* generated before the user provides the details of the various fields of the plot line. The user interface allows the user to edit the label of the plotline.

The steps 1020, 1040, 1050, and 1060 may be repeated to receive the specification of a plurality of plot lines. The user interface manager further receives 1070 an expression of labels as a specification of new set of graphs. For example, as shown in FIG. 9, the plot line 640*c* is specified as an expression A/(A+B), where A and B are labels associated with previously specified plot lines 640*a* and 640*b*.

In an embodiment, the data stream language processor 200 executes the data stream language program specified by each plot line to generate a set of result data streams representing the output of the plot line. The data stream language processor 200 associates each result data stream with one or more attributes uniquely identifying the result data stream. For example, if the plot line specifies an aggregation associated with a group-by clause specifying one or more attributes, each result data stream is associated with a combination of values of the one or more attributes. The data stream language processor 200 matches corresponding result data streams from each plot line. The data stream language processor 200 generates a result data stream for the plot line specified as the expression by computing the value of the specified expression for matching data values from the result data streams.

For example, assume that plot line A result is the intermediate data streams D11, D12, and D13 associated with data centers dc1, dc2, and dc3 respectively (for example, as a result of grouping by datacenter attribute). Similarly assume that plot line B result is the intermediate data streams D21, D22, and D23 associated with data centers dc1, dc2, and dc3 respectively (as a result of grouping by datacenter attribute). Further assume that plot line C is specified as an expression based on labels A and B, for example, A+B (or A/B). The expression based on labels is also referred to herein as a label expression. The plot line C results in three result data streams, D31, D32, and D33. The data stream language processor 200 selects a data value v11 from intermediate data stream D11 and a data value v21 from intermediate data stream D21 that correspond to the same time interval and determines a data value v31 for result data stream D31. For example, if the expression based on the labels is A/B, the data value v31 is determined as v11/v21. Similarly, if the expression based on the labels is A/(A+B), the data value v31 is determined as v11/(v11+v21).

Furthermore, data stream language processor 200 selects a data value from intermediate data stream D12 and a data value from intermediate data stream D22 that correspond to the same time interval and determines a data value for result data stream D32. And the data stream language processor 200 selects a data value from data stream D13 and a data value from D23 that correspond to the same time interval and determines a data value for data stream D33. For each time interval, the computation is repeated, result in the generation of the result data streams D31, D32, and D33.

Assume that each plot line A and B were generated based on a data stream language program that specified a group by clause based on a set of attributes values (corresponding to dimensions). The set of attributes values may comprise attribute attr1, attr2, and attr3. Each intermediate result stream generated corresponding to the input plot lines for the label expression corresponds to a set of values of the attributes. For example, a the In an embodiment, the data stream language processor 200 determines associations between each of the plurality of intermediate data streams and the result data stream based on a label expression. In an embodiment, the plot lines used for specifying each input data stream uses a group by expression based on a set of attributes. The intermediate data streams D11 and D12 correspond to attribute vales (a1, b1, c1), the intermediate data streams D21 and D22 correspond to attribute vales (a2, b2, c2), the intermediate data streams D31 and D32 correspond to attribute vales (a3, b3, c3). The data stream language processor 200 associates intermediate data streams D11 and D21 since they have the same set of attribute values (a1, b1, c1). Similarly, the stream language processor 200 associates intermediate data streams D21 and D22 since they have the same set of attribute values (a2, b2, c2). Finally, the stream language processor 200 associates intermediate data streams D31 and D32 since they have the same set of attribute values (a3, b3, c3).

In an embodiment, the user interface manager 280 allows users to specify a time shift for a data stream language program (corresponding to a plot line). Assume that the user interface manager receives a specification of a first plot line that generates a first set of data streams, D1, D2, and D3. The user interface manager further receives a specification of a second plot line that matches the specification of the first plot line except for a time shift value. Alternatively, the user interface manager may receive a specification of second plot line that takes the result data streams of the first plot line and adds the specification of time shift to the result data streams. The time shift value specifies a length of a time interval, say T seconds. The instrumentation analysis system 100 generates the result data streams of the second plots lines as being identical for the result data streams of the first plot line but shifted by time T. Accordingly, each data value of a result data stream of the second plot line matches the data value of the corresponding result data stream of the first plot line that occurred T seconds before the current time. For example, the result data streams of the second plot line may be D1', D2' and D3' corresponding to the result data streams D1, D2, and D3 respectively of the first plot line. A data value d1 of data stream D1' at time t is same as the data value d1' of data stream D1 at time t-T. Similarly, data value d2 of data stream D2' at time t is same as the data value d2' of data stream D2 at time t-T and data value d3 of data stream D3' at time t is same as the data value d3' of data stream D3 at time t-T.

The user may specify an expression based on a data stream language program and a time shifted version of the data stream language program. For example, if the first plot line has label A and the second plot line has label B, the user may specify a third plot line C that compares data values of A and B, for example, A−B, A/B, or (A−B)/B. Accordingly, the plot line generates a set of data streams that compare the data values of the data streams of plot line A with data values of data streams of plot line B, i.e., data values of data streams of plot line A that are time shifted by a given time interval. This allows the instrumentation analysis system to compare a result of a plot line with results obtained previously (for example, an hour ago, a day ago, or a month ago).

Specifying Policies for Rollup, Later Arriving Data, and Extrapolation

A set of data streams processed by a plot line are typically associated with a common metric type, for example, a gauge, counter or cumulative counter. The rollup applied to the plot line is determined based on the metric type. The instrumentation analysis system choses the defaults in each case to ensure that values displayed are accurate and stable across different data resolutions. For example, the instrumentation analysis system choses mean as the available rollup for gauge metric type, rate per second or sum as the available rollups for counter metric type and rate per second, delta (difference in consecutive values), or maximum as the available rollups for metric type cumulative counter.

As an example, assume that the instrumentation analysis system receives a gauge that is reporting every 5 seconds. In a chart with a time range of 1 minute, the user interface shows all reported values on a chart, as there would typically be enough screen area available to show the data at its native resolution, i.e. 12 data points sent during a 1-minute period. However, if the user changes the time range to 1 week, the instrumentation analysis system automatically switches to a coarser data resolution to match, with 500 or fewer visible data points to plot (depending on screen size). In this case, the instrumentation analysis system uses the mean rollup to calculate the average value of the gauge, over each time interval at the coarser data resolution.

With one week's worth of data, each visible data point is the average of the values sent during a roughly 4-minute interval. The instrumentation analysis system plots those average values, instead of, for example, a sampled value. Accordingly, the instrumentation analysis system provides a more accurate representation of the data, that also averages out peaks and valleys. For a counter or cumulative counter, the chosen rollup affects not only the accuracy, but more generally how the chart behaves as the user changes the time range. For example, assume that the instrumentation analysis system receives data stream with a metric that is a counter that indicates a number of responses handled by a server per 1-second interval. If the instrumentation analysis system uses the default rollup of rate per second, then in a chart with a time range small enough to show the time series at its native resolution, the instrumentation analysis system shows each reported value normalized by the interval, i.e. number of responses during each 1-second interval, divided by 1 (the number of seconds in that interval). However, if the user changes the time range, such that each data point to plot represents a 4-minute interval, then the instrumentation analysis system plots the sum of all the responses during that 4-minute interval, divided by 240 (the number of seconds in that interval). This chart provides an accurate representation of the data.

In contrast, if the instrumentation analysis system chooses the sum rollup, then the behavior of the chart changes with different data resolutions. In a chart with a time range small enough to show the time series at its native resolution, each reported value is the same as in the rate per second case, as the sum rollup will occur over a 1-second interval. In a chart with a 4-minute interval, however, the values shown are the sum of all values during the 240 seconds. This is likely to generate a value that is significantly higher than the normalized rate per second rollup. A delta rollup for cumulative counters has behavior equivalent to the sum rollup for regular counters. The max rollup, in contrast, simply provides the value of the counter at the relevant points in time.

In some instances, the data of the input data streams is sparse due to collection policies, failures or network conditions. In an embodiment, the instrumentation analysis system excludes a data point that is missing for a certain period from all data calculations. The instrumentation analysis system uses an extrapolation policy to create data points in place of missing data. The instrumentation analysis system selects a specific policy based on the metric and rollup type. For example, the instrumentation analysis system uses a zero extrapolation for a counter metric with a sum rollup, whereas, the instrumentation analysis system uses a last value extrapolation for a gauge with a mean rollup. In an embodiment, the instrumentation analysis system receives a maximum extrapolations parameter indicating the number of consecutive data points for which the selected policy is applies. A value of −1 indicates that the extrapolation will apply indefinitely. Another extrapolation policy used by the instrumentation analysis system is linear (using the last two or more policies to extrapolate the value of the missing data point).

In some instances, a data point arrives late in a given time interval. Assume that a chart displays the average of the CPU utilization metrics from 10 servers. Assume that 9 of the servers report every 10 seconds and are on time. One server may be slow and submit data with a gap between wall time and logical time that is 10 minutes long. So even though this machine is sending one data point every 10 seconds, those data points are all arriving 10 minutes late.

The instrumentation analysis system uses a max delay parameter that specifies the maximum time that the instrumentation analysis system will wait for data to arrive for a specific chart. For example, if max delay is set to 5 minutes, the instrumentation analysis system will wait for no more than 5 minutes after time t for data that has been times tamped with time t. Accordingly, the leading edge of a chart (for example, the CPU utilization chart) will be no more than 5 minutes behind the current time, and the slow server will not be considered for the purpose of calculating the average in the streaming chart. When the data from the slow server does arrive, the instrumentation analysis system stores the data, such that any re-calculation of the average will take it into account. As such, the max delay allows users to control the trade-off between correctness and timeliness. If the max delay parameter is set to the default, 'Auto', the instrumentation analysis system samples the timeliness of the reporting time series to determine an appropriate value. The instrumentation analysis system selects a value to accommodate most (if not all) data by adopting the maximum observed lag after discarding substantial laggards (slow or late servers).

User Interfaces for Specifying Detectors

The user interface manager provides user interfaces that allow users to create detectors. A detector monitors certain data streams and sends alerts when data of the data streams crosses defined thresholds. A specification of a detectors comprises: specification identifying data streams (or signal) to monitor, a set of rules that define thresholds such that alerts are generated when the data of a data stream crosses the threshold, identification of users who should be notified if or when the test data streams cross the specified thresholds. Rules may define static thresholds (like "a value above 20") or dynamic thresholds (like "a value above last week's value plus 3 standard deviations"). Accordingly, threshold values may be defined as a data stream language program such that a result data stream defines the threshold. Accordingly, the threshold value may change over time based on certain input data streams. The instrumentation analysis system may send alert notifications using email, text message, or any application that can communicate with a user. A detector may be considered as detecting anomalies in the system.

Figure 11:
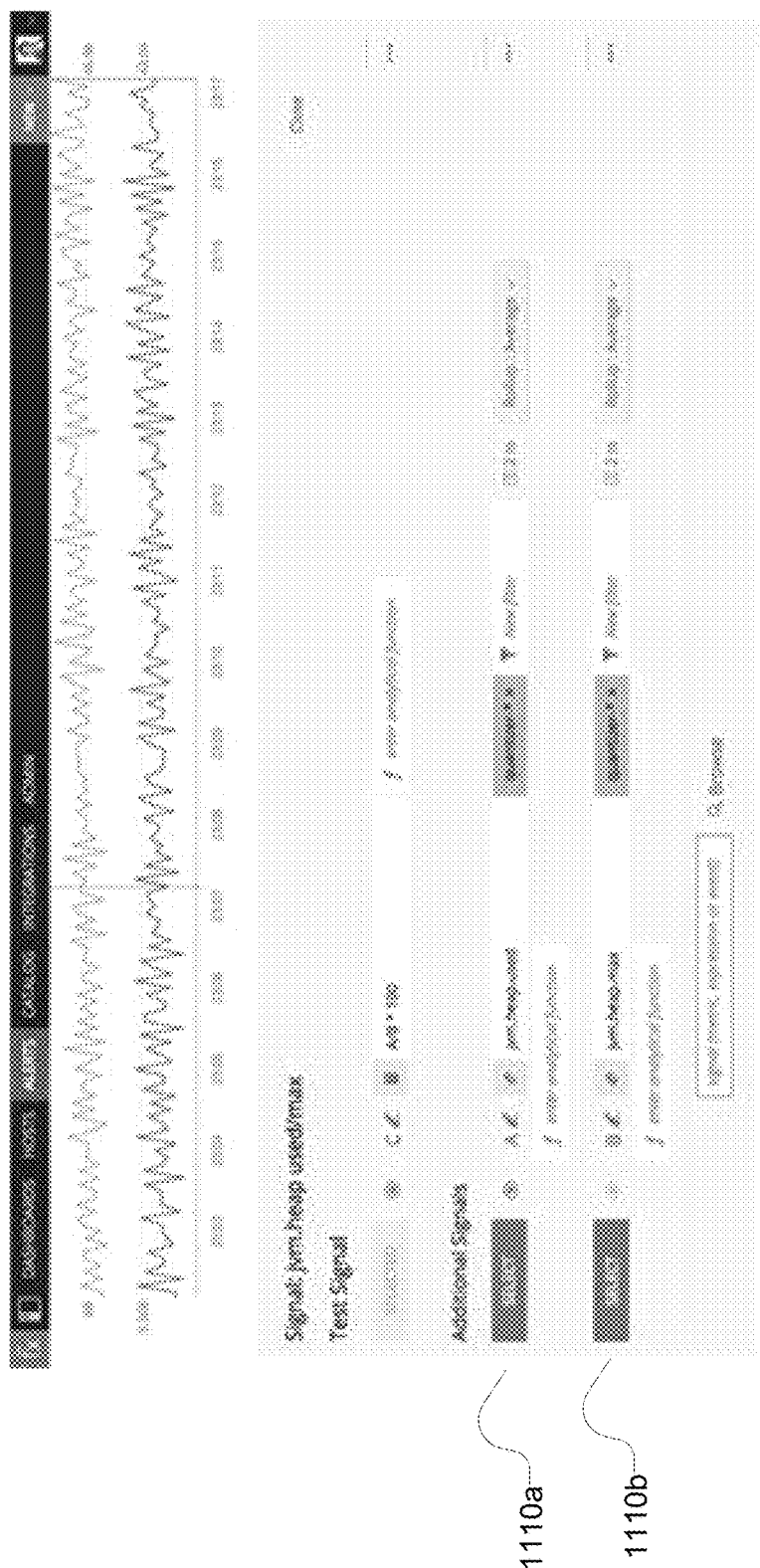
FIG. 11 shows a screen shot of a user interface for allowing users to select a detector, according to an embodiment.

FIG. 11 shows a screen shot of a user interface for allowing users to select a detector, according to an embodiment. As shown in FIG. 11 a user can select a test signal or a test data stream for specifying detectors. The test signal is the metric or time series (or set of data streams) that the user specifies for monitoring using a detector. If the user is creating a detector from a chart, the user can select any of the signals on the chart as the test signal. FIG. 11 shows the buttons 1110 for selecting a specific set of data streams specified as a plot line. A user can define a new plot line that generates a set of data streams and use the output data streams as the test signal.

Figure 12:
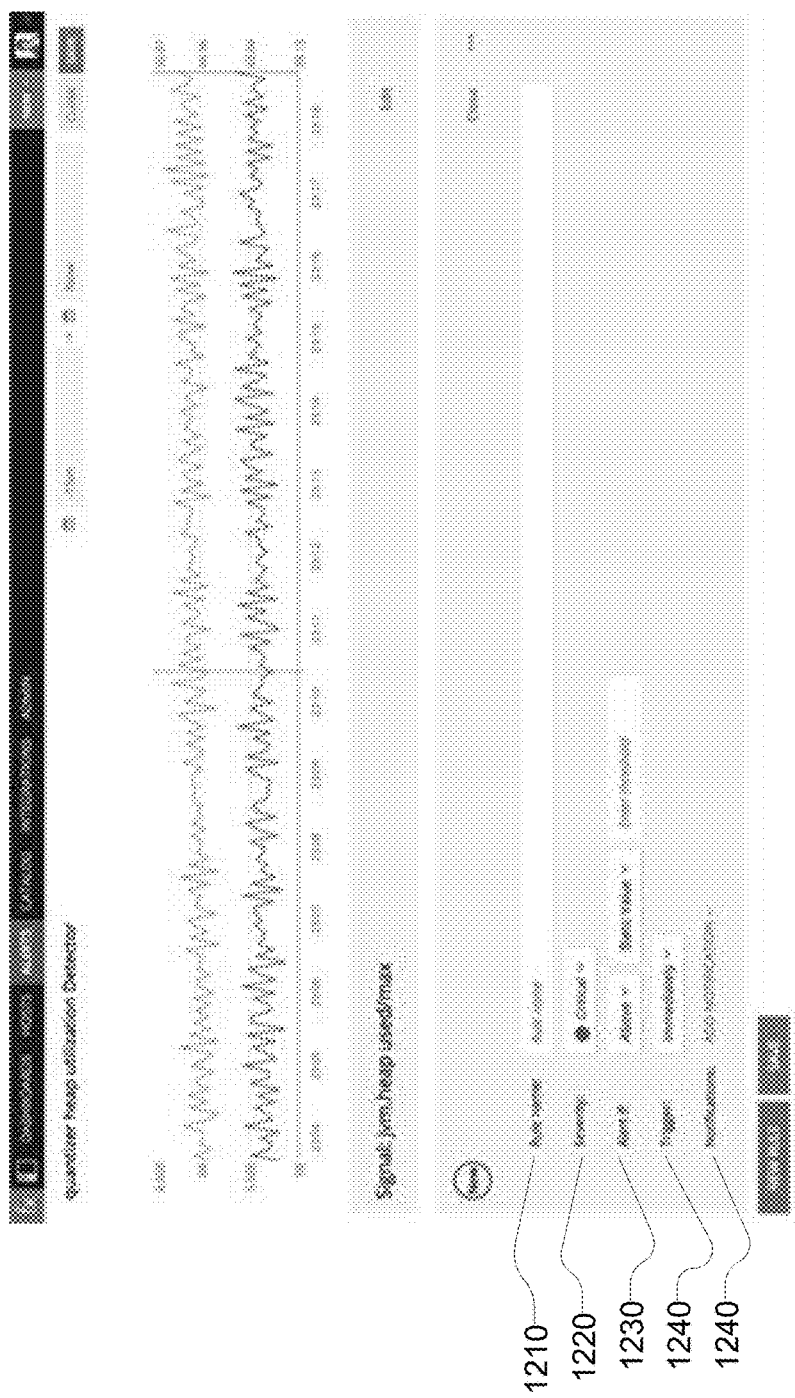
FIG. 12 shows a screen shot of a user interface for allowing users to specify a rule for a detector, according to an embodiment.

FIG. 12 shows a screen shot of a user interface for allowing users to specify a rule for a detector, according to an embodiment. Once the user specifies a test signal, the user further specifies rules. The user interface manager receives following properties of a rule from the user. The specification of a rule comprises a rule name 1210, that is a human-readable name for the rule. The specification of a rule further comprises a severity 1220 that indicates an importance of the alerts generated by this rule, as determined by the user. Examples of 5 severity labels are critical, major, minor, warning, and info. The specification of a rule further comprises an alert-if condition 1230 that the test signal must fulfill for alerts to be sent. The user interface manager allows the user to specify the condition 1230 using a comparison type (above, below, within range, or out of range) and a threshold. The threshold may be a static value that is provided by a user, or a signal (or set of signals).

The specification of a rule further comprises a trigger 1240 that specifies the amount of time that the test signal must meet the alert-if condition before alerts are sent out. This option helps prevent alerts from being sent due to transient fluctuations in signals. Examples of triggers provided by the user interface manager for receiving a user selection include: "immediately" for sending alerts as soon as an alert-if condition occurs; "duration" for sending an alert if the signal has met the alert-if condition for the defined duration (specifying time in units such as m (minutes), h (hours), d (days), w (weeks) or M (months)); and "percent of duration" for sending an alert if the alert-if condition is met for a percent of a moving duration window, for example, defining "80% of 10 minutes" would send an alert if the condition is met for 8 of the last 10 minutes.

Evaluating Plot Line Expressions

The instrumentation analysis system allows users to specify expressions based on labels identifying input plot lines defined previously. Each input plot line may generate a set of result data streams. The plotline defined as an expression generates a set of result data streams evaluated based on the sets of result data streams generated by the input plot lines.

As an example, the instrumentation analysis system receives a specification of a first plot line that generates a set of result data streams by computing a first aggregate function (F1) that is grouped by a particular property (or tag) of the input data streams. For example, the plot line may specify grouping by a datacenter. Accordingly, each result data stream corresponds to data values for a datacenter. The number of groups may change over time if the data centers of the input data streams change. The instrumentation analysis system may display the graphs corresponding to each result data stream. The instrumentation analysis system may further receive a specification of a second plot line that computes a second set of result data streams by computing another aggregate function (F2) that is grouped by the same property (or tag) of the input data streams. For example, the second aggregate function (e.g., F2) may be same as F1 with a time shift added to the computation. Accordingly, the aggregate function corresponds to the values determined by F1 for the first plot line but for a previous time point (for example, a hour ago). Alternatively, the aggregate function F2 may comprise the specification of F1 composed with a transformation that determines a moving average value (or any other moving aggregate function). Accordingly, each data stream of the second result set corresponds to a data stream of the first result set that is smoothed based on a moving average (or a moving aggregate function). The instrumentation analysis system receives a specification of a detector that uses the second plot line as dynamic threshold for the first plot line. For example, the instrumentation analysis system may generate an alert if a result stream of the first plot line exceeds the moving average value of the data stream computed over a moving time window by a threshold value (for example, by 10%).

In an embodiment, the instrumentation analysis system receives a specification of a first plot line (Pa) that computes a set of result data streams by computing a first aggregate function (G1) that is grouped by a particular property (or tag) of the input data streams. The instrumentation analysis system may further receive a specification of a second plot line (Pb) that computes a second set of result data streams by computing another aggregate function (G2) that performs the aggregate over all the input data streams (without grouping the data by any property). For example, the first plot line may determine an estimate of load per data center and the second plot line may determine an overall estimate of load for the entire distributed system (across all datacenters). The instrumentation analysis system may further receive a third plot line (Pc) that is specified as Pa/Pb*100. Accordingly, the instrumentation analysis system determines for each result data stream of plotline Pa, a value representing the load for a datacenter as a percentage of the total load of across all datacenters. The example is not limited to loads but can compute any other property/tag or attribute. Furthermore, the groups are not limited to datacenters but can be any other property. Accordingly, the instrumentation analysis system can determines a ratio of an aggregate value computed over groups of an attribute/property of the input data streams divided by the aggregate value computed over all the input data streams.

In an embodiment, the instrumentation analysis system receives a specification of a first plot line (Px) that computes a set of result data streams by computing a first aggregate function (H1) that is grouped by a first set of dimensions (properties or attributes or tags) of the input data streams, for example, set Sx. The plot line Px is associated with label Lx and the plotline Py is associated with the label Ly. The instrumentation analysis system further receives a specification of a first plot line (Py) that computes a set of result data streams by computing a second aggregate function (H2, which in some instances can be same as H1) that is grouped by a second set of dimensions of the input data streams for example, set Sy.

There are various embodiments, depending on the elements of two sets Sx and Sy. In one embodiment, the first set of dimensions is a subset of the second set of dimensions. For example, assume that the first set of dimensions Sx=(X, Y) and the second set of dimensions Sy=(X, Y, Z). Assume that the first plot line Px generates a set Rx of result data streams and the second plot line Py generates a set Ry of result data streams.

Since the second set of dimensions Sy includes more dimensions than the first set Sx, the number of result data streams generated for the plot line Px is more than the number of result data streams generated for plot line Py. This is so, because the number of possible combinations of values of 3 dimensions are more than the number of combinations of values for two dimensions (assuming there are a plurality of values of the additional dimension). The data stream language processor 200 matches the dimensions of result data streams generated by the plot line Px against the result data streams generated by the plot line Py. In particular, the data stream language processor 200 matches the dimensions of the result data streams that are common in the sets of dimensions of the result data streams two plot lines. For example, in the above example, the data stream language processor 200 compares the dimensions X and Y of the two sets Rx and Ry of results data streams since X and Y are the dimensions that are common to the sets of dimensions Sx and Sy.

The data stream language processor 200 associates each result data stream of set Ry having dimensions (x1, y1, zi) where zi can take one or more values of the Z dimension, with the result data stream (x1, y1) of set Rx. Accordingly, the data stream language processor 200 associates result data streams of the two plot lines so long as their corresponding dimensions (if available) match. The data stream language processor 200 processes a new plot line Pz defined as an expression of the labels representing the plot lines Px and Py (for example, a function func(Lx, Ly), such as Lx+Ly, Lx−Ly, Lx/Ly, etc.) as follows. The data stream language processor 200 generates a result data stream for the new plot line for each pair of result data streams of the plot lines Px and Py that have matching dimensions. Each data point of the result data stream of the new plot line is obtained by applying the function func(Lx, Ly) to corresponding data points of the matching result data streams from a time interval. For example, assume that a result data stream Dx from plot line Px matches result data stream Dy from plot line Py, and the corresponding result data stream for the new plot line Pz is Dz. Further assume that the result data stream Dx and Dy have data values dx1, and dy1 for a particular time interval. The data stream language processor 200 determines the data value for result data stream Dz for that time interval as func(dx1, dy1). Similarly, if the result data stream Dx and Dy have data values dx2, and dy2 for the next time interval, the data stream language processor 200 determines the data value for the next time interval for Dz as func(dx2, dy2). The data stream language processor 200 continues determining the data values for the result data streams for each subsequent time interval (or as data becomes available). Furthermore, the data stream language processor 200 determines data values for all result data streams of the plot line Pz.

In some embodiments, the sets Sx and Sy have the same number of dimensions. Accordingly, the data stream language processor 200 matches corresponding result data streams for the two plot lines as both plot lines generate result data streams having the same number of dimensions. Accordingly, each result data stream generated by plot line Px matches at most one result data stream of plot line Py and vice versa.

In another embodiment, one of the sets, for example, Sx has zero dimensions. Accordingly, the user specifies an aggregate function without grouping the results by any dimensions. In this embodiment, the data stream language processor 200 generates a single data stream for the plot line Px by aggregating all input data streams. Accordingly, all result data streams of the plot line Py match against the result data stream of plot line Px.

The user interface manager 280 configures the user interface to display various properties reported by the data streams for selection by the user. The number of properties reported by different servers may be different. For example, servers from a particular data center may report a first set of properties and servers from another data center may report a different set of properties. Accordingly, the instrumentation analysis system 100 may receive and store a large number of dimensions describing the data streams, the dimensions comprising properties reported by servers as data streams and metadata attributes specified independent of the data streams.

Figure 13:
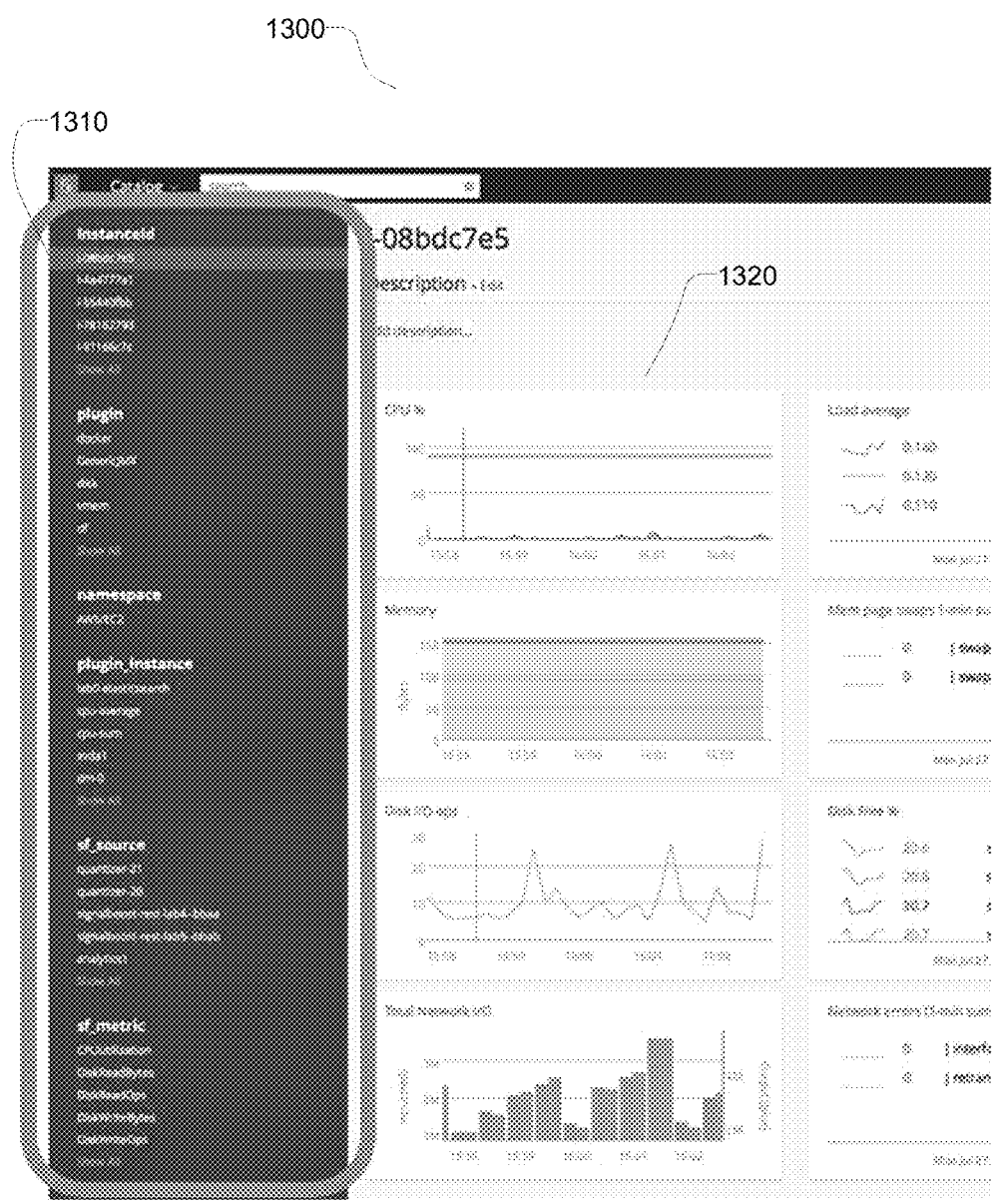
FIG. 13 shows a screen shot of a user interface for allowing users to select a property, according to an embodiment.

FIG. 13 shows a screen shot of a user interface 1300 for allowing users to select a property, according to an embodiment. The user interface manager 280 configures and presents the user interface shown in FIG. 13 that includes a widget referred to as a dimension selector 1310 that shows various dimensions describing the data streams received and processed by the instrumentation analysis system 100. The dimension selector 1310 allows users to select a dimension. Each dimension in the dimension selector 1300 is shown as a name of the dimension and one or more values of the dimension.

In an embodiment, the user interface manager 280 receives from the user a filter configured to determine a subset of servers and display one or more charts displaying data describing the filtered subset of servers. Alternatively, the user interface manager 280 receives from the user a filter configured to determine a subset of data streams and display one or more charts displaying data describing the filtered subset of data streams. The dimension selector 1310 allows users to specify a selection of a dimension for filtering the servers or data streams, such that the filtered set of servers includes servers reporting a selected property or a filtered set of data streams comprises data streams that are associated with a particular dimension value. In embodiment, the user interface manager 280 shows a set of charts 1320 based on the selection of dimensions specified by the user.

The instrumentation analysis system 100 may receive from the user, an expression based on metadata attributes that acts as the filter. For example, an expression received by the instrumentation analysis system 100 may filter the servers by a name, by a data center name, by a location, or any other metadata attribute. In an embodiment, the user interface 1300 comprises an expression builder widget that assists users in building an expression. The expression builder widget provides the dimension selector 1310 to allow users to select specific dimensions or dimension values.

The set of dimensions shown by the dimension selector 1310 is ranked and selected based on the filtered set of servers. The instrumentation analysis system 100 identifies all data streams obtained from the filtered set of servers. The instrumentation analysis system 100 identifies all dimensions that are associated with the identified data streams. The instrumentation analysis system 100 determines statistics describing distribution of values for each identified dimension. The instrumentation analysis system 100 ranks the dimensions shown by the dimension selector 1310 based on the determined statistics. In an embodiment, the instrumentation analysis system 100 determines a score as a weighed aggregate of different types of statistics collected by the instrumentation analysis system 100.

The instrumentation analysis system 100 determines a total number of data values of a dimension reported by the set of data streams of the filtered set of servers. The total number of data values aggregates the number of times each distinct data value is received. In an embodiment, the instrumentation analysis system 100 ranks dimensions with larger total number of data values reported higher than dimensions with fewer values reported. Accordingly, the instrumentation analysis system 100 determines that dimensions with more frequently reported values are more relevant and of interest to users.

In an embodiment, the instrumentation analysis system 100 determines a total number of data values of a dimension reported by the set of data streams of the filtered set of servers. The total number of data values aggregates the number of times each distinct data value is received. In an embodiment, the instrumentation analysis system 100 ranks dimensions with larger total number of data values reported higher than dimensions with fewer values reported. Accordingly, the instrumentation analysis system 100 determines that dimensions with more frequently reported values are more relevant and of interest to users compared to dimensions with less frequently reported values.

In an embodiment, the instrumentation analysis system 100 determines a measure of recency of reporting for a dimension. Accordingly, a dimension with more recently reported data values is ranked higher than a dimension with data values that were reported relatively less recently. In an embodiment, the instrumentation analysis system 100 determines the measure of recency for a dimension as an aggregate value based on age for all data values. An age of a data value is the time difference between present time and the time at which the data value was received. The aggregate value may be a mean, median, mode, or any other statistics that represents the age of a set of values. In an embodiment, the instrumentation analysis system 100 determines the measure of recency for two dimensions based on data values reported during the same time interval.

total number of data values of a dimension reported by the set of data streams of the filtered set of servers. The total number of data values aggregates the number of times each distinct data value is received. In an embodiment, the instrumentation analysis system 100 ranks dimensions with larger total number of data values reported higher than dimensions with fewer values reported. Accordingly, the instrumentation analysis system 100 determines that dimensions with more frequently reported values are more relevant and of interest to users compared to dimensions with less frequently reported values.

In an embodiment, the instrumentation analysis system 100 determines the number of distinct data values of a dimension reported by the set of data streams of the filtered set of servers. The total number of distinct values of a dimension is also referred to as the cardinality of the dimension. Accordingly, if each distinct value is counted only once, independent of the number of times the value is reported by servers. In an embodiment, the instrumentation analysis system 100 ranks dimensions with fewer distinct data values higher than dimensions with large number of distinct values reported. This is so, because users are more likely to perform analysis based on dimensions with fewer attributes, for example, slicing and dicing of large data sets. On the other hand, dimensions with more than a threshold number of distinct values are determined by the instrumentation analysis system to be less relevant for purposes of analysis and are ranked lower. Accordingly, the instrumentation analysis system 100 determines that dimensions with fewer distinct values are more relevant and of interest to users compared to dimensions with large number of distinct values.

The instrumentation analysis system 100 periodically repeats the statistical analysis of the data streams received and revalues the ranking of the dimensions in the dimension selector 1310. Accordingly, the instrumentation analysis system 100 gives higher weight to statistics collected recently compared to older statistics. In an embodiment, the instrumentation analysis system 100 determines statistics of dimensions based on the recent most time window of a particular length. Accordingly, the instrumentation analysis system 100 uses a moving window for determining statistics of dimensions. The instrumentation analysis system 100 dynamically updates the ranked list of dimensions shown in the dimension selector 1310. Accordingly, a first set of dimensions is shown by the dimension selector 1310 during a first time interval which may be different from a second set of dimensions shown by the dimension selector 1310 during a second time interval subsequent to the first time interval. Similarly, a set of dimensions may be shown by the dimension selector 1310 ordered based on a first ranking in a first time interval but ordered based on a second ranking during a second time interval. The rank and set of dimensions shown by the dimension selector 1310 changes with the changes in the distribution of data values reported by the servers in the data streams.

The instrumentation analysis system 100 may receive a large number of data streams from servers. Accordingly, visual presentations of these data streams are difficult to interact with. For example, a time line of data streams may show hundreds or thousands of graphs each associated with a data stream. Analyzing these graphs is challenging. Embodiments of the instrumentation analysis system 100 allow visual interactions that simplify analysis of these graphs. The user interface manager 280 configures for presentation, user interface 1400 and 1500 shown in FIGS. 14 and 15 that allow users to analyze data streams.

Figure 14:
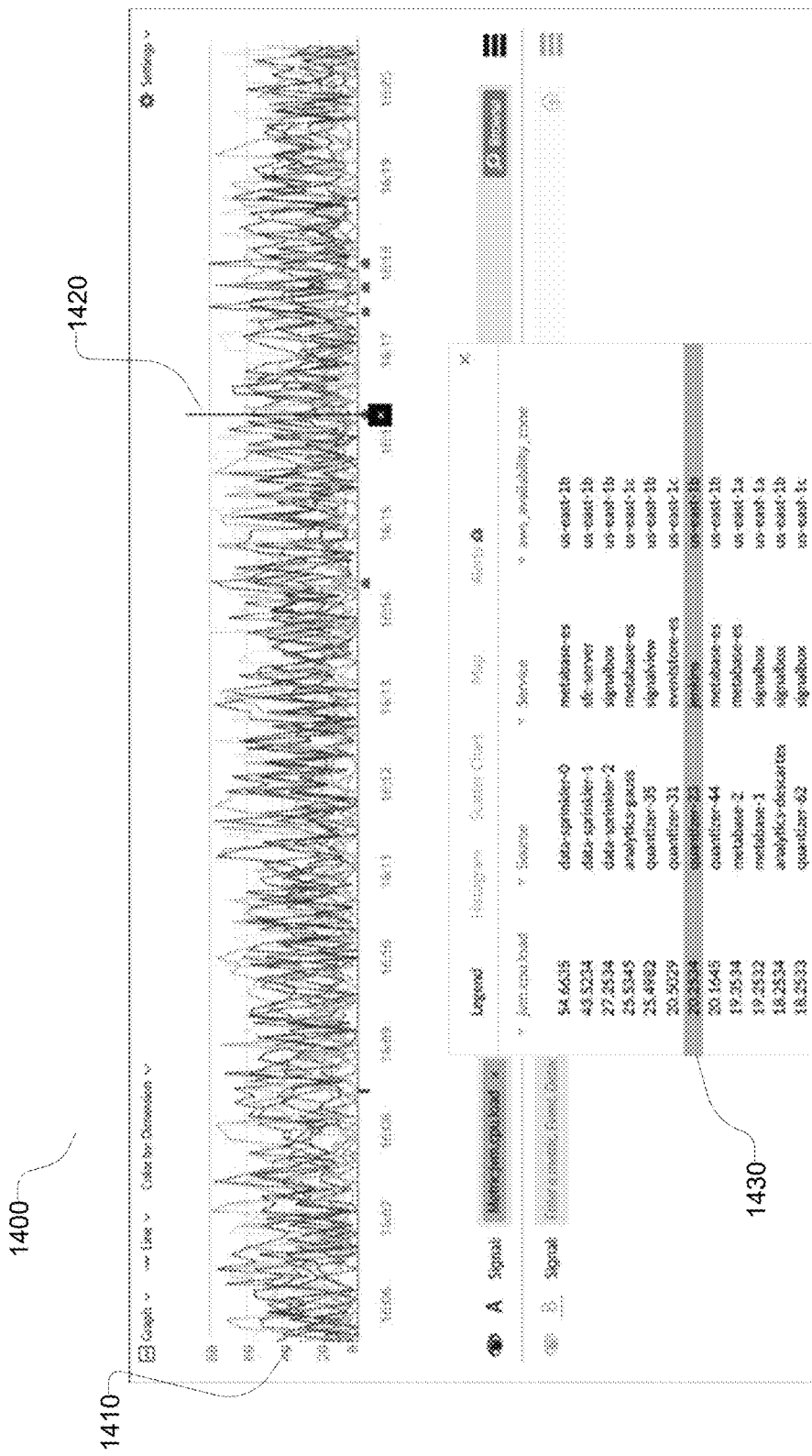
FIG. 14 shows a screen shot of a user interface showing a legend displaying details of data associated with a point in time, according to an embodiment.

FIG. 14 shows a screen shot of a user interface showing a legend displaying details of data associated with a point in time, according to an embodiment. The user interface 1400 shows a chart 1410 comprising visual representation (for example, graphs) representing a plurality of data streams. The graphs shown in chart 1410 show data values of data streams along y-axis and time along x-axis. The user interface manager 280 receives a selection 1420 of a point in time. For example, the user interface 1400 receives a selection of a point in time responsive to a user clicking on a data point with x-coordinate corresponding to the point in time that the user selected.

The user interface 1400 shows a legend 1430 displaying details of data associated with the selected point in time. The legend 1430 shows data corresponding to various dimensions for the selected point-in time. For example, the chart 1410 may show a particular dimension D1. The legend 1430 however may show one or more dimensions other than the dimension D1. Each dimension corresponds to a column of the legend 1430 and each row corresponds to a tuple representing data values of various dimensions corresponding to the selected point in time.

The legend 1430 allows users to identify any anomalies in the data corresponding to the selected point in time. In an embodiment, the user interface 1400 is configured to receive a selection of a column shown in the legend. For example, the user interface 1400 receives a selection of a column responsive to a user clicking on data of a column or the header of the column. In response to receiving the selection of a column of the legend 1430, the instrumentation analysis system 100 generates a report that groups data of the data streams corresponding to the point in time by the selected column. For example, the chart 1410 may display cpu (central processing unit) load and a the selection of a column may identify a service name such that the generated report shows average cpu load for each service. This allows a user to perform various types of analysis of the data of the data streams shown in chart 1410. The report showing the dimension corresponding to the selected column allows users to drill down to specific values to study anomalies in detail.

Figure 15B:
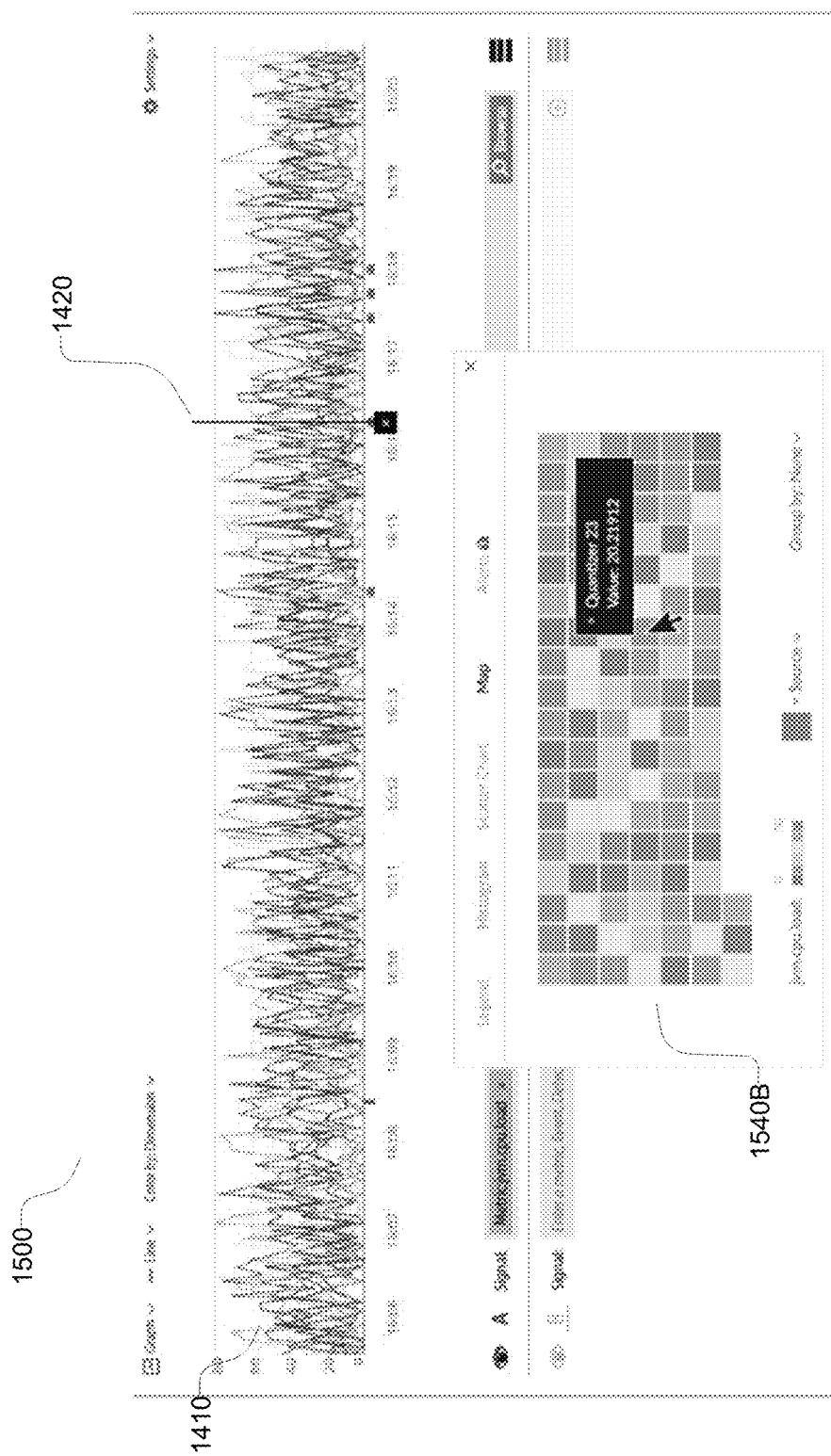
Figure 15C:
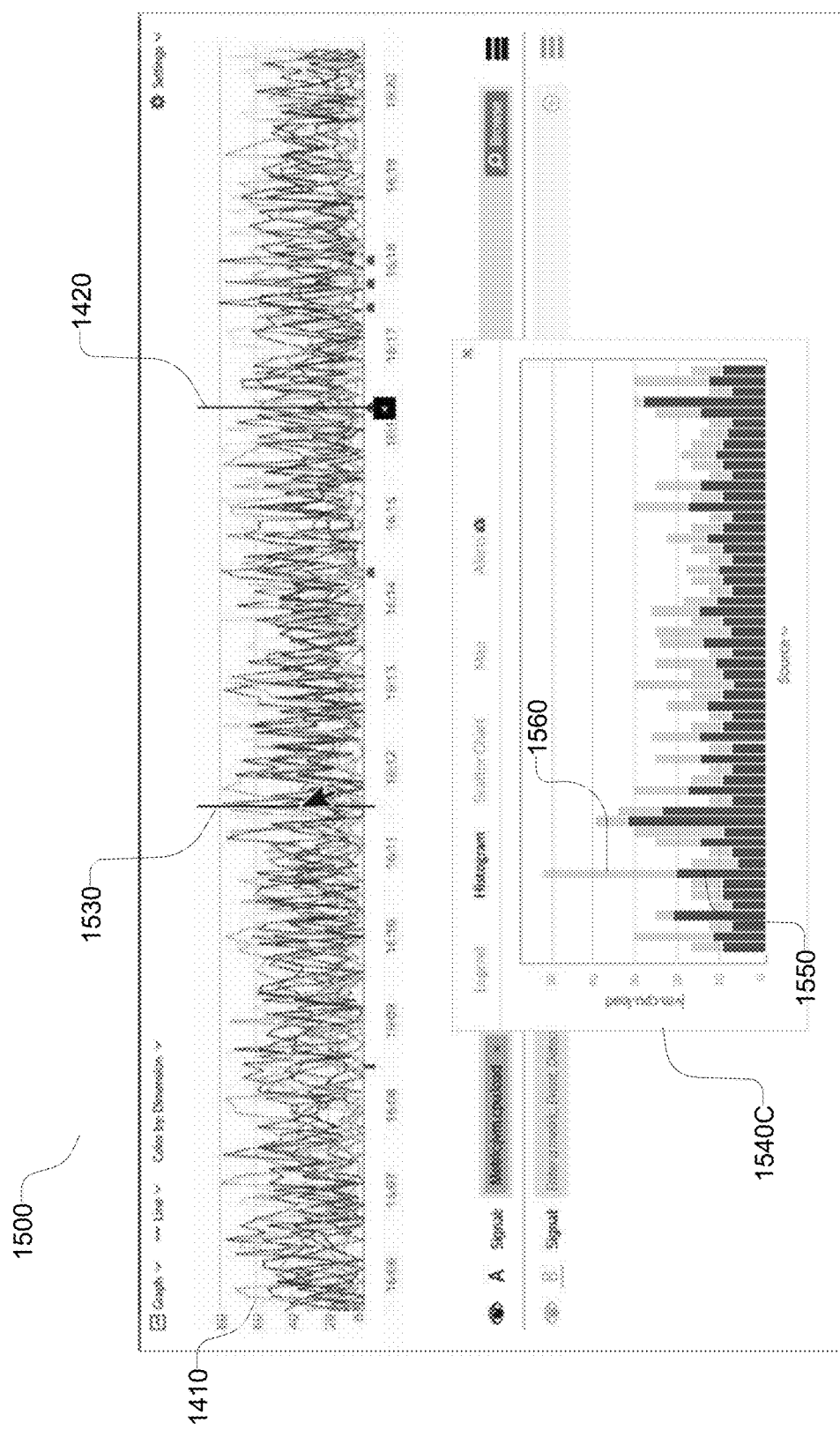

In an embodiment, the user interface 1400 displays details of the data of the selected point in time as a chart, for example, a histogram showing distribution of the data values of the selected point in time, a scatter plot showing distribution of the points, or a heat map. FIGS. 15A, 15B, and 15C show screen shots of a user interface for analyzing data associated with a point in time, according to an embodiment. The user interface 1500 shows a chart 1540 showing distribution of the data values of the selected point in time. The chart 1540A shown in FIG. 15A is a scatter plot and chart 1540B shown in FIG. 15B is a histogram.

The user interface 1500 allows the user to change the x-axis of the chart 1540. For example, assume that the charts 1410 shows a dimension D1 against time. The example dimension D1 shown in FIG. 15 is the property "jvm.cpu.load" but could be any other property. The widget 1545 shown in FIG. 15A allows the user to change the x-axis of the scatter plot chart 1540A to plot dimension D1 against any other dimension Dn. The widget 1545 is a drop down list that allows users to select one of a plurality of dimensions associated with data values at the selected point in time. FIG. 15B shows screen shot of a user interface showing a heat map 1540B based on data values associated with a selected point in time 1410.

FIG. 15C shows a screen shot of a user interface for comparing data associated with a point in time with corresponding data associated with other points-in-time, according to an embodiment. The user interface 1500 is receives a selection of a first point in time 1420. The user interface 1500 displays the chart 1540 that is a histogram showing distribution of values associated with point in time 1420. The user interface 1500 receives a selection of a second point in time 1530. The user interface 1500 modifies the histogram 1540 to show distribution of data values associated with the first point in time along with distribution of data values associated with the second point in time. For example, a bar 1560 showing distribution of a data value at the second point in time is shown overlaying a bar 1550 showing distribution of a data value at the first point in time. In another embodiment, the user interface 1500 shows a scatter plot that presents data values associated with the first point in time along with data values associated with the second point in time. The representation of data values associated with the first point in time is distinguished from the representation of data values associated with the second point in time, for example, by using distinct shapes for the two sets of values, or by using different color, shading, brightness, or any other characteristic for the two set of data values.

Applications Based on Analysis of Data Streams

The instrumentation analysis system can be used for performing analysis of dynamically changing system configurations. For example, reports can be generated that perform a dynamic node count (where a node is a computer or processor in a distributed system being analyzed, for example, an instance of the development system 120). Accordingly, if the count of the nodes dynamically changes, the instrumentation analysis system can be used to plot graphs that show the dynamic changes in the nodes being used. Assume that every node used has a unique identifier, e.g. an instance_id or hostname, and each instance is sending a data stream with metric instance.cpu (a system metric).

Furthermore, websearch instances are sending in the metric websearch.num_requests (an application-specific metric).

The nodes can be associated with a dimension that is common across all the websearch nodes for filtering and aggregation. Alternatively, the nodes can be named using a pattern that works with wildcard searches, e.g. websearch*. As an example, a dimension is added to all of the metrics being sent in, 'service:[name_of_service]'. To analyze the CPU utilization across only the websearch nodes, the user can specify the metric as instance.cpu to receive input data streams from all nodes, and then apply the appropriate dimension filter (service:websearch) to filter the nodes that correspond to the subset being analyzed. The number of active websearch instances can change dynamically and the instrumentation analysis system automatically generated the reports based on websearch nodes.

The instrumentation analysis system can be used to determine how load balanced the nodes of the distributed system are. For example, to determine load balancing effectiveness, the instrumentation analysis system may execute a data stream language program that determines the ratio of work being performed by the least loaded node to the most loaded node. The closer the resulting ratio is to 1, the better the load balancing. More specifically, the data stream language program can determine a ratio of the minimum websearch.num_requests and the maximum websearch.num_requests. The graphs plotted as a result of execution of this data stream language program determine the value of the ratio and continuously (or periodically) update the result to generate a graph showing the changes in the ratio over time.

Another application of the data stream language programs is capacity planning. A system may encounter a surge in incoming requests causing new bottlenecks in the pipeline of application services that process those requests. Those bottlenecks define the systems effective peak capacity, and the surge may not be detected until it is too late to take remedial actions. Data stream language programs are defined and executed by instrumentation analysis system to collect system metrics (CPU, memory, disk I/O, network) along with application-specific metrics (number of requests, request latency, and so on.) The data stream language program provides information that allows the user to identify the limiting system resource for a service. The data stream language program determines the limiting resource as the one that gets saturated first as application load increases. The data stream language program generates data streams that identify whether CPU, memory, disk or network is the systems scarcest resource. The instrumentation analysis system allows users to setup detectors to alert the user when the overall utilization of that identified resource is outside the desired band, enabling the user to add or remove nodes in a timely manner. For example, as indicated by the websearch example, the user can create a dashboard to show service performance along with resource utilization. To manage the system's capacity for websearch, the user may define a detector that determines if the average CPU utilization exceeds an 80% threshold, for example, for 15 minutes.

Alternative Embodiments

It is to be understood that the Figures and descriptions of the present invention have been simplified to illustrate elements that are relevant for a clear understanding of the invention, while eliminating, for the purpose of clarity, many other elements found in a typical system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise. Upon reading this disclosure, those of skill in the art will appreciate still additional alternative structural and functional designs for a system and a process for generating reports based on instrumented software through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A method for specifying a data stream language program, the method comprising:
   receiving a plurality of input data streams providing data generated by instrumented software executing on one or more external systems;
   configuring for presentation, a user interface for specifying data stream language programs, the user interface comprising one or more widgets for receiving expressions specified using the data stream language;
   receiving, via the user interface, a plurality of data stream language programs, each data stream language program configured to generate a set of intermediate result data streams, the receiving comprising, for each data stream language program:
      receiving an analytic function for computing an aggregate value based on a plurality of data values, each data value obtained from a distinct input data stream;
   receiving, via the user interface, an association of each data stream language program with a label;
   receiving a specification of a combined data stream language program as an expression based on the labels; and
   configuring for presentation a visual representation of a set of final result data streams generated from the combined data stream language program, each final result data stream comprising result data values, each result data value obtained by evaluating the expression based on the labels by replacing each label by a data value from an intermediate result data stream of the data stream language program corresponding to the label.

2. The method of claim 1, wherein each final result data value is associated with a time interval, such that the final result data value is obtained by evaluating the expression based on intermediate data value associated with the time interval.

3. The method of claim 1, wherein receiving, via the user interface, each data stream language program comprises:
   receiving a filter expression for determining a subset of the input data streams.

4. The method of claim 1, wherein receiving, via the user interface, each data stream language program comprises:
   receiving a transformation expression for aggregating the plurality of data values of an input data stream.

5. The method of claim 1, further comprising:
   selecting a set of dimensions describing data streams received, the selecting based on statistics describing data values of the dimension received in the data streams; and
   displaying the set of dimensions via the user interface, the displayed set of dimensions for receiving a selection of a dimension.

6. The method of claim 5, further comprising:
   repeatedly reevaluating the set of dimensions based on recent statistics describing the dimensions associated with data streams; and
   updating the set of dimensions presented via the user interface based on the reevaluated set of dimensions.

7. The method of claim 5, wherein selecting the set of dimensions comprising ranking various dimensions describing the data streams received, the ranking based on the statistics describing each dimension from the set of dimension, wherein the set of dimensions is displayed based on the ranking.

8. The method of claim 7, wherein a first dimension is ranked higher compared to a second dimension responsive to receiving a larger number of data values for the first dimension compared to the second dimension in a time interval.

9. The method of claim 7, wherein a first dimension is ranked higher compared to a second dimension responsive to receiving a smaller number of distinct data values for the first dimension compared to the second dimension in a time interval.

10. The method of claim 7, wherein a first dimension is ranked higher compared to a second dimension responsive to having a higher measure of recency of the data values for the first dimension compared to the second dimension in a time interval, the measure of recency based on an aggregate value based on the age of each data value of the dimension received within the time interval.

11. The method of claim 7, further comprising:
    repeatedly reevaluating the ranking of the dimensions based on recent statistics describing the dimensions associated with data streams to generate a new ranking of the dimensions; and
    updating an order in which the dimensions are presented via the user interface based on the new ranking.

12. A computer readable non-transitory storage medium storing instructions thereon, wherein the instructions when executed by a processor cause the processor to perform the steps of:
    receiving a plurality of input data streams providing data generated by instrumented software executing on one or more external systems;
    configuring for presentation, a user interface for specifying data stream language programs, the user interface comprising one or more widgets for receiving expressions specified using the data stream language;
    receiving, via the user interface, a plurality of data stream language programs, each data stream language program configured to generate a set of intermediate result data streams, the receiving comprising, for each data stream language program:
       receiving an analytic function for computing an aggregate value based on a plurality of data values, each data value obtained from a distinct input data stream;
    receiving, via the user interface, an association of each data stream language program with a label;
    receiving a specification of a combined data stream language program as an expression based on the labels; and
    configuring for presentation a visual representation of a set of final result data streams generated from the combined data stream language program, each final result data stream comprising result data values, each result data value obtained by evaluating the expression based on the labels by replacing each label by a data value from an intermediate result data stream of the data stream language program corresponding to the label.

13. The computer readable non-transitory storage medium of claim 12, wherein the instructions when executed by a processor further cause the processor to perform the steps of:

selecting a set of dimensions describing data streams received, the selecting based on statistics describing data values of the dimension received in the data streams; and displaying the set of dimensions via the user interface, the displayed set of dimensions for receiving a selection of a dimension.

14. The computer readable non-transitory storage medium of claim 12, wherein the instructions when executed by a processor further cause the processor to perform the steps of:

repeatedly reevaluating the set of dimensions based on recent statistics describing the dimensions associated with data streams; and updating the set of dimensions presented via the user interface based on the reevaluated set of dimensions.

15. The computer readable non-transitory storage medium of claim 12, wherein selecting the set of dimensions comprising ranking various dimensions describing the data streams received, the ranking based on the statistics describing each dimension from the set of dimension, wherein the set of dimensions is displayed based on the ranking.

16. The computer readable non-transitory storage medium of claim 15, wherein a first dimension is ranked higher compared to a second dimension responsive to receiving a larger number of data values for the first dimension compared to the second dimension in a time interval.

17. The computer readable non-transitory storage medium of claim 15, wherein a first dimension is ranked higher compared to a second dimension responsive to receiving a smaller number of distinct data values for the first dimension compared to the second dimension in a time interval.

18. The computer readable non-transitory storage medium of claim 15, wherein a first dimension is ranked higher compared to a second dimension responsive to having a higher measure of recency of the data values for the first dimension compared to the second dimension in a time interval, the measure of recency based on an aggregate value based on the age of each data value of the dimension received within the time interval.

19. The computer readable non-transitory storage medium of claim 15, further comprising:

repeatedly reevaluating the ranking of the dimensions based on recent statistics describing the dimensions associated with data streams to generate a new ranking of the dimensions; and updating an order in which the dimensions are presented via the user interface based on the new ranking.

20. A computer-implemented system for processing data generated by instrumented software, the system comprising:

a computer processor; and a computer readable non-transitory storage medium storing instructions thereon, wherein the instructions when executed by a processor cause the processor to perform the steps of:

receiving a plurality of input data streams providing data generated by instrumented software executing on one or more external systems;

configuring for presentation, a user interface for specifying data stream language programs, the user interface comprising one or more widgets for receiving expressions specified using the data stream language;

receiving, via the user interface, a plurality of data stream language programs, each data stream language program configured to generate a set of intermediate result data streams, the receiving comprising, for each data stream language program:

receiving an analytic function for computing an aggregate value based on a plurality of data values, each data value obtained from a distinct input data stream;

receiving, via the user interface, an association of each data stream language program with a label;

receiving a specification of a combined data stream language program as an expression based on the labels; and configuring for presentation a visual representation of a set of final result data streams generated from the combined data stream language program, each final result data stream comprising result data values, each result data value obtained by evaluating the expression based on the labels by replacing each label by a data value from an intermediate result data stream of the data stream language program corresponding to the label.

* * * * *

UNITED STATES PATENT AND TRADEMARK OFFICE
CERTIFICATE OF CORRECTION

| | |
|---|---|
| PATENT NO. | : 9,892,020 B1 |
| APPLICATION NO. | : 15/277787 |
| DATED | : February 13, 2018 |
| INVENTOR(S) | : Eyal Ophir and Kevin Cheng |

Page 1 of 1

It is certified that error appears in the above-identified patent and that said Letters Patent is hereby corrected as shown below:

In the Claims

In Column 33, Claim 2, Line 44, delete "based on intermediate data value" and insert --based on an intermediate data value--.

In Column 34, Claim 7, Lines 4 and 5, delete "each dimension from the set of dimension" and insert --each dimension from the set of dimensions--.

In Column 35, Claim 15, Line 19, delete "each dimension from the set of dimension" and insert --each dimension from the set of dimensions--.

Signed and Sealed this
Fourth Day of September, 2018

Andrei Iancu
*Director of the United States Patent and Trademark Office*